United States Patent [19]
Lobo et al.

[11] Patent Number: 5,835,616
[45] Date of Patent: Nov. 10, 1998

[54] FACE DETECTION USING TEMPLATES

[75] Inventors: Niels da Vitoria Lobo; Young Ho Kwon, both of Orlando, Fla.

[73] Assignee: University of Central Florida, Orlando, Fla.

[21] Appl. No.: 261,947

[22] Filed: Jun. 17, 1994

Related U.S. Application Data

[63] Continuation-in-part of Ser. No. 198,816, Feb. 18, 1994, abandoned.

[51] Int. Cl.[6] .................................................. G06K 9/00
[52] U.S. Cl. ............................. 382/118; 382/115
[58] Field of Search .................... 382/115, 117, 382/118, 190, 199; 235/382, 380; 340/825.34

[56] References Cited

U.S. PATENT DOCUMENTS

| | | | |
|---|---|---|---|
| 3,805,238 | 4/1974 | Rothjell | 340/146.3 E |
| 4,516,262 | 5/1985 | Sakurai | 382/18 |
| 4,792,900 | 12/1988 | Sones et al. | 382/131 |
| 4,858,000 | 8/1989 | Lu | 358/84 |
| 4,975,969 | 12/1990 | Tal | 382/2 |
| 5,008,946 | 4/1991 | Ando | 382/117 |
| 5,012,522 | 4/1991 | Lambert | 382/2 |
| 5,163,094 | 11/1992 | Prokoski et al. | 382/2 |
| 5,164,992 | 11/1992 | Turk et al. | 382/2 |
| 5,339,367 | 8/1994 | Roth | 382/199 |
| 5,432,864 | 7/1995 | Lu et al. | 382/118 |
| 5,432,866 | 7/1995 | Sakamoto | 382/117 |

*Primary Examiner*—Yon J. Couso
*Attorney, Agent, or Firm*—Brian S. Steinberger

[57] ABSTRACT

Disclosed is a two step process for automatically finding a human face in an electronically digitized image (for example, taken by handheld digital cameras and digital video-cameras such as cam-corders), and for confirming the existence of the face by examining facial features. Step 1 is to detect the human face and is accomplished in stages that include enhancing the digital image with a blurring filter and edge enhancer in order to better set forth the unique facial features such as wrinkles, and curved shapes of a facial image. After prefiltering, preselected curves sometimes referred to as snakelets are dropped on the image where they become aligned to the natural wrinkles and curves of a facial image. Step 2 is to confirm the existence of the human face in seven stages by finding facial features of the digital image encompassing the chin, sides of the face, virtual top of the head, eyes, mouth and nose of the image. Ratios of the distances between these found facial features can be compared to previously stored reference ratios for recognition. This method for detecting facial features of an image can be used in applications such as but not limited to detecting human faces for the gathering of population age-statistics from patrons at entertainment/amusement parks and television network viewer-rating studies. Such gathering can include counting the patrons, distinguishing certain age and gender groups, and/or identifying specific people. Computer vision with this capability can further have application in such fields as automated surveillance systems, demographic studies, automated photography for point-and-shoot cameras and human computer interactions. Automated photography can eliminate the manual adjustment problems that result in poor quality from lack of focused subjects. Computer systems can utilize this system to recognize and respond to the specific needs of a user, and further translate for human users.

3 Claims, 19 Drawing Sheets

Head Template

Fig. 15 (a) ratio 1    Fig. 15 (b) ratio 2    Fig. 15 (c) ratio 3
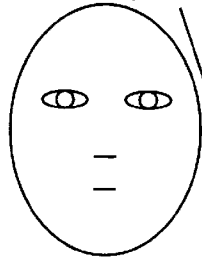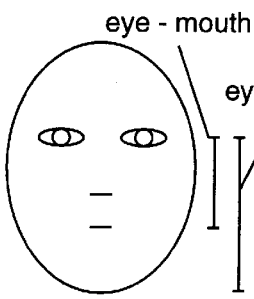
Fig. 15 (d) ratio 4    Fig. 15 (e) ratio 5
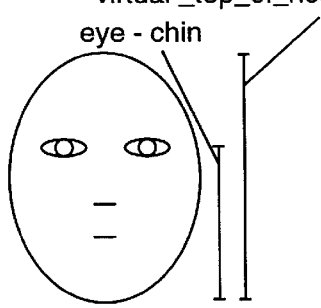
Fig. 15 (f) ratio 6

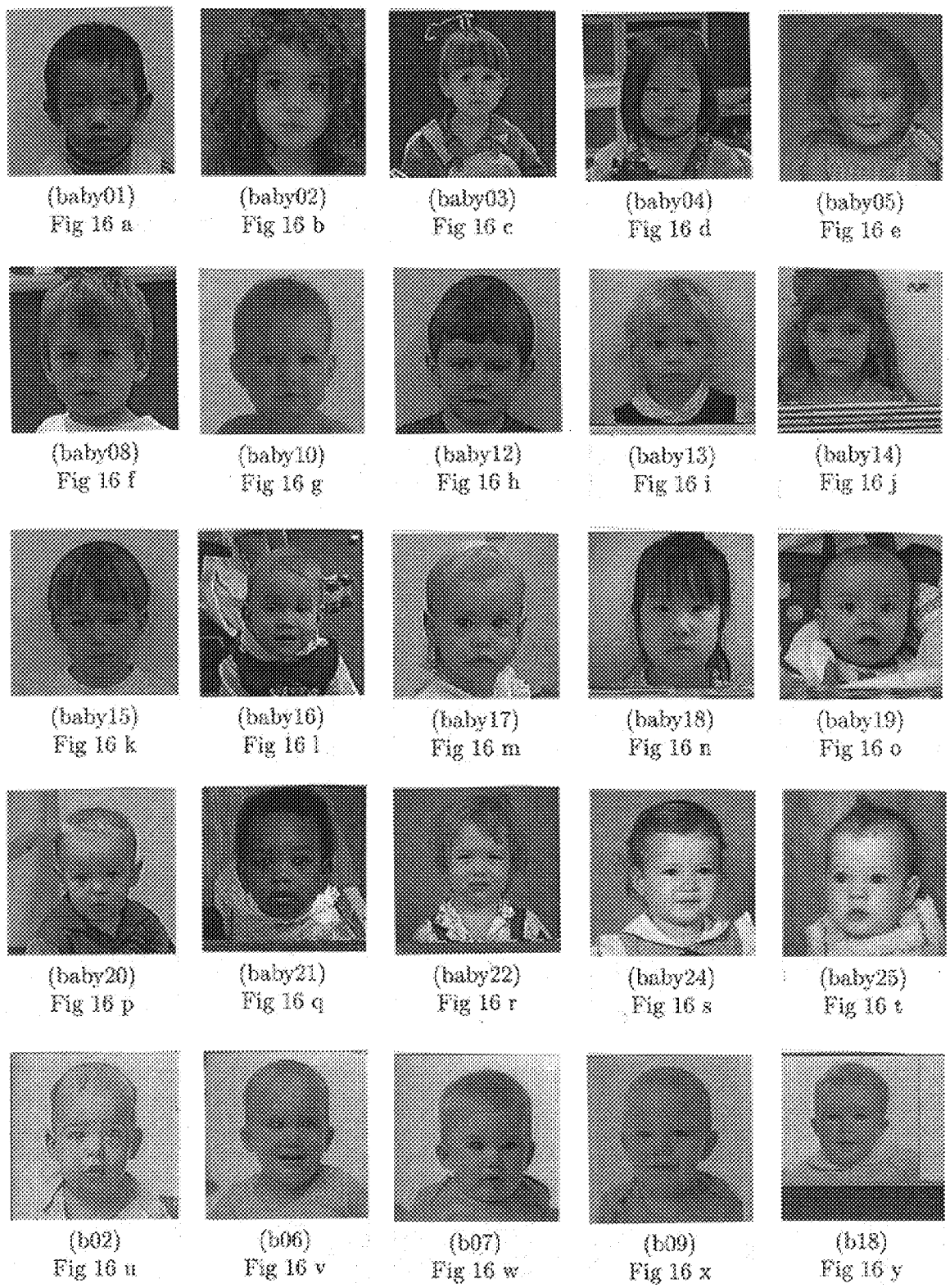

 (baby01) Fig 17 a
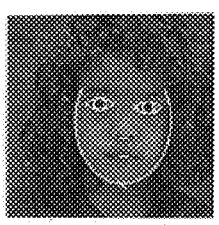 (baby02) Fig 17 b
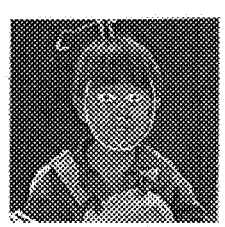 (baby03) Fig 17 c
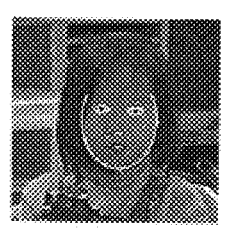 (baby04) Fig 17 d
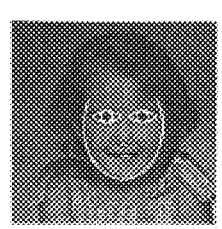 (baby05) Fig 17 e
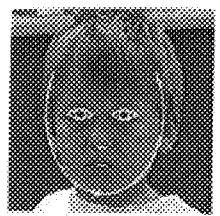 (baby08) Fig 17 f
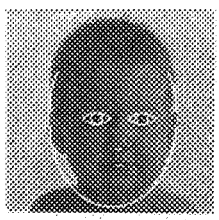 (baby10) Fig 17 g
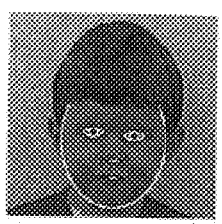 (baby12) Fig 17 h
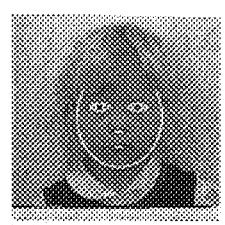 (baby13) Fig 17 i
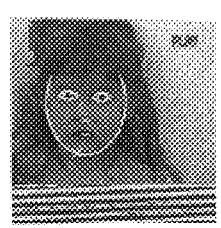 (baby14) Fig 17 j
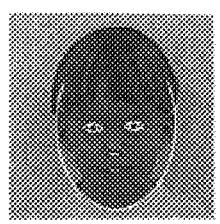 (baby15) Fig 17 k
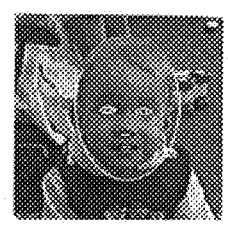 (baby16) Fig 17 l
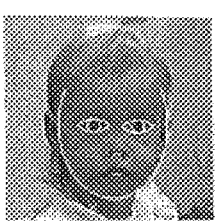 (baby17) Fig 17 m
 (baby18) Fig 17 n
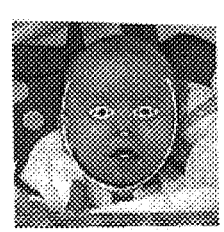 (baby19) Fig 17 o
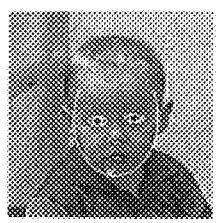 (baby20) Fig 17 p
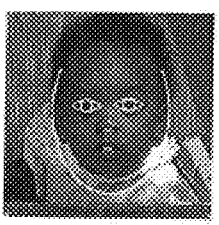 (baby21) Fig 17 q
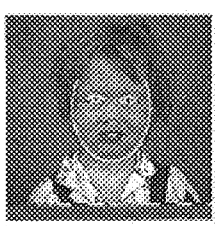 (baby22) Fig 17 r
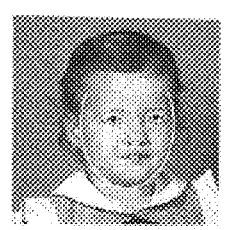 (baby24) Fig 17 s
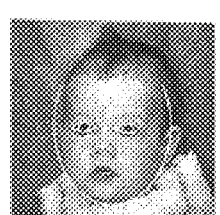 (baby25) Fig 17 t
 (b02) Fig 17 u
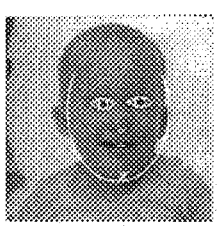 (b06) Fig 17 v
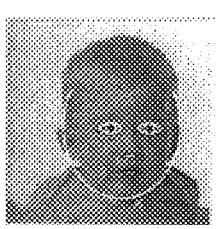 (b07) Fig 17 w
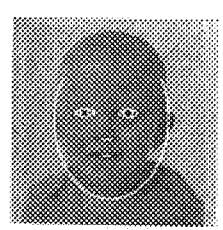 (b09) Fig 17 x
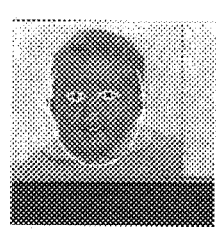 (b18) Fig 17 y (adult01)

(adult04)

(a01)

(a02)

(a04)

(a06)

(a12)

(a19)

(snr01)

(snr02)

(snr03)

(snr05)

(snr06)

(snr07)

(snr10)

(snr11)

(snr15)

(snr18)

(s01)

(s10)

(s11)

(s12)

(adult01)

(adult04)

(a01)

(a02)

(a04)

(a06)

(a12)

(a19)

(snr01)

(snr02)

(snr03)

(snr05)

(snr06)

(snr07)

(snr10)

(snr11)

(snr15)

(snr18)

(s01)

(s10)

(s11)

(s12)

FACE DETECTION USING TEMPLATES

This invention relates to detecting human faces, and in particular to a process for automatically finding and detecting a human face from digital images. This application is a continuation-in-part to application Ser. No. 08/198,816 filed on Feb. 18, 1994 now abandoned entitled Automatic Feature Detection and Age Categorization of Human Faces in Digital Images.

BACKGROUND AND PRIOR ART

Humans are generally able to categorize a person to a precise age group based on an image of the person's face. Humans also have the capability of recognizing familiar faces as well as recognizing facial expressions. For computers to have these visual capabilities would represent a major commercial advantage. However, current computer vision systems lack the ability of finding faces in images and completing facial analysis.

U.S. Pat. No. 3,805,238 to Rothjell describes a method of identifying human beings using selected facial body curves. However, this patent is limited to the facial side profiles and does not analyze minute detailed curves such as the facial wrinkles which are unique to each human being and is not specifically concerned with digitally created images. U.S. Pat. No. 4,975,969 to Tal describes analyzing facial parameters. However, this patent also does not analyze the unique facial features of the subject being examined. U.S. Pat. No. 5,163,094 to Prokoski et al. describes a system for identifying individuals from images. However, this patent restricts the detected image to that taken by a thermogram. The thermogram pictures used in Prokoski et al. generally center on various heat levels that are broadly generated by a face but the thermograph pictures themselves do not recognize or show the specific wrinkles that are unique to each individual's face.

Using computer vision to analyze for faces and to interpret facial-expressions, can be used in various application areas such as but not limited to the gathering of population and age-statistics from patrons at entertainment/amusement parks and television network viewer-rating studies. Computer vision with this capability can further have application in such fields as automated security/surveillance systems, demographic studies, safety monitoring systems, human interfaces to computers, and automated photography.

Current problems exist with manual operated cameras. In photography, one may wish to aim the camera in the vicinity of a subjects face and have the camera center itself on that face automatically. Normally, users must take time to manually adjust the camera lens and the body of the camera itself. Such manual adjustments would also be needed if the person taking a picture must search for a single recognized face from multiple faces in a scene. With manual adjustments, the quality of the pictures can than depend upon the skill of the user. The manual adjustments usually results in different users taking nonuniform pictures of dissimilar quality if they all use the same camera at different times. An automated point-and-shoot camera and camcorder would eliminate the adjustment problems prevalent from making manual adjustments. None of the prior art listed above allows for detecting a facial image that would allow for a camera to automatically align itself to point and shoot a subject Automated point-and-shoot cameras using face detection technology can create pictures of a uniform quality by different users.

Another problem exists where computers are interacting and responding to human users. While computers may be able to differentiate between audible word commands, the inventors are not aware of any such systems that will allow a computer to interpret and respond to the facial images of a user. For example, a human's moves their lips to say no, and/or frowns, and/or shakes their head from side-to-side, another person naturally interprets these expressions as a negative response to a question even when no sounds are audible. None of the prior art cited above addresses the problems of recognizing the common meaning intended by a particular facial feature. Thus, in human computer interfaces it is advantageous to be able to find the human face in the scene, so that the computer can respond to the facial expression of the human, and then be able to interpret the plain meaning of the facial features of that human. Utilizing a computer to translate the facial features of a human can have significant applications such as but not limited to serving the needs of the blind and deaf.

SUMMARY OF THE INVENTION

The first objective of the present invention is to provide an automatic method for detecting a human face from a digital image.

The second object of this invention is to provide a method of using computer vision to recognize the existence of a facial image from a digital image.

The third object of this invention is to provide a method of confirming that facial features exist from the detected human face.

A fourth object of this invention is to provide a method to interpret and recognize the common meaning intended by the facial image.

A preferred embodiment is described for using a two step process for automatically finding a human face in an electronically digitized image (for example, taken by a videocamera), and for confirming the existence of the face by examining facial features. The first step is to detect the human face and is accomplished in five stages. Stage one is to convolve a digital image with a blurring filter and with an edge enhancer. Stage two is to drop a population of preselected curves, sometimes referred to as snakelets, onto the digital image. Stage three is to eliminate these curves from plateaus, Stage four is having the curve nodes vote for a facial oval. Stage five of the first step is to allow for non-maximal suppression of the votes from step four. Step 2 is to confirm the existence of the human face in seven stages by: 1. finding an initial rough oval that encompasses the chin from the image; 2. adjusting the oval to find the chin of a face; 3. finding the sides of a face; 4. finding the eyes in the face; 5. finding the mouth of the face; 6. finding the nose of the face; and 7 verifying the normalicy of facial feature ratios from the found facial features of stages 3 through 6. Ratios of the distances between these found facial features can be compared to previously stored reference ratios for recognition.

Further objects and advantages of this invention will be apparent from the following detailed description of a presently preferred embodiment which is illustrated schematically in the accompanying drawings.

BRIEF DESCRIPTION OF THE FIGURES

FIGS. 15a through 15f illustrates the six ratios that are to be evaluated for age classification for Step 2 of FIG. 2.

FIGS. 16a through 16y shows the original images for the baby class.

FIGS. 17a through 17y shows the final fit for the baby class of FIGS. 16a through 16y.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
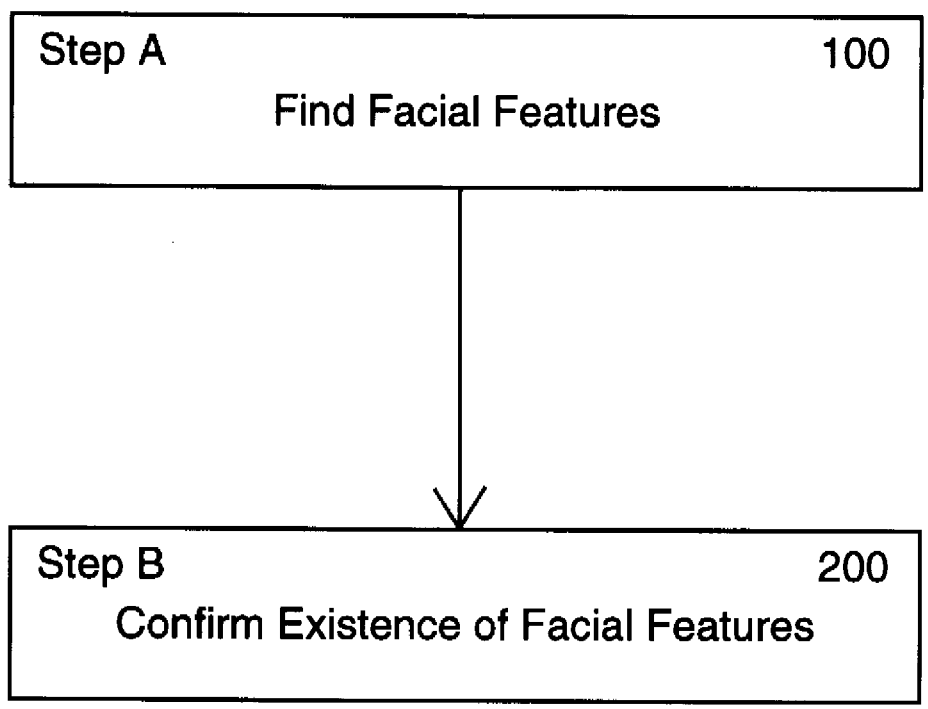
FIG. 1 is a flow chart overview of the two step process used in the preferred embodiment for the invention.
Figure 2:
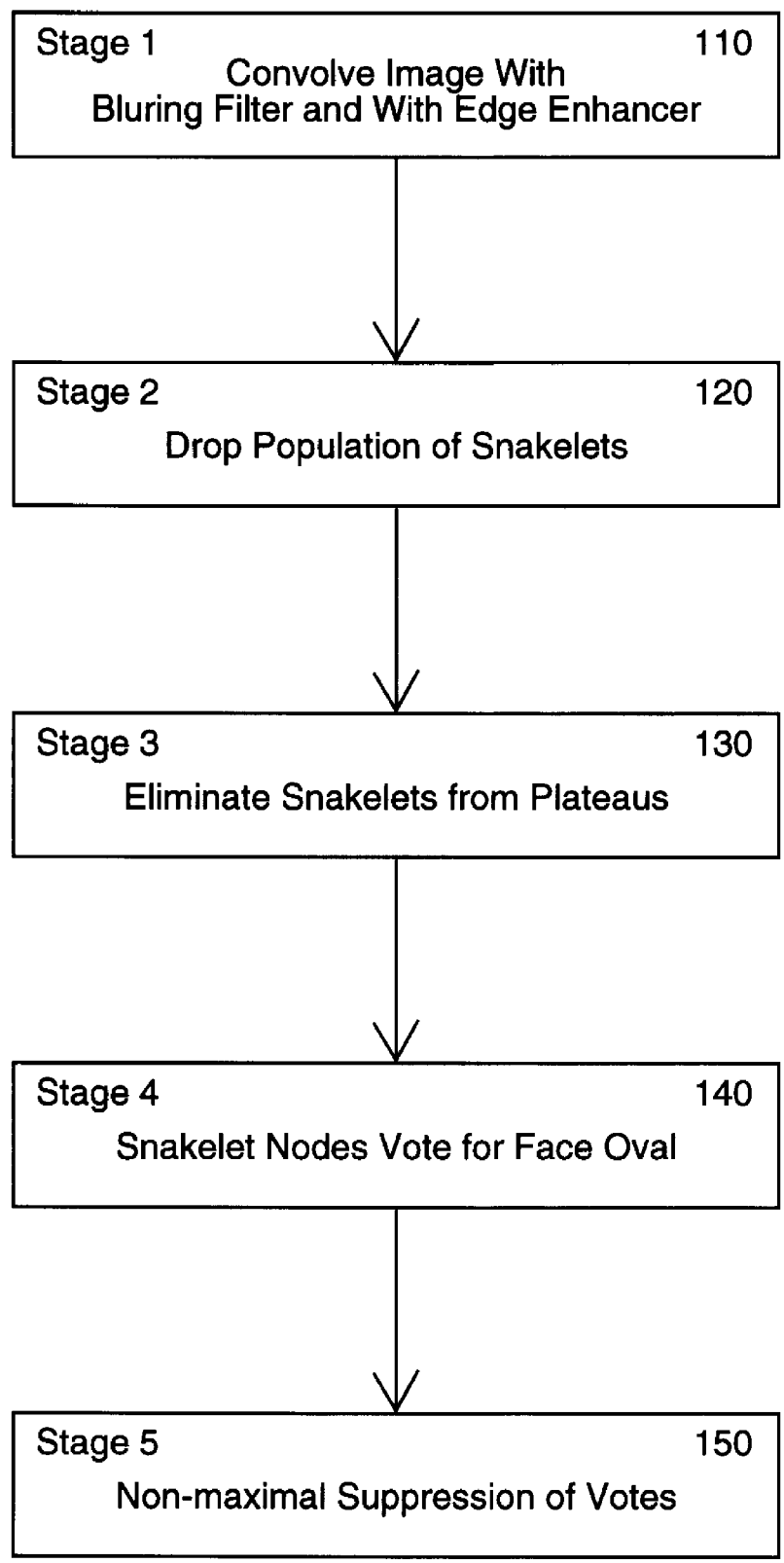
FIG. 2 illustrates the five stages followed in step one of FIG. 1.

FIG. 1 is a flow chart overview of the two step process used in the preferred embodiment for the invention. The first step A, 100, covers finding a candidate face from a digital image. The details of this step are illustrated in FIG. 2. The second step B, 200, is to confirm that facial features exist from the candidate face.

FIG. 2 illustrates the five stages followed in step one of FIG. 1, and are broadly discussed as follows. In stage one, 110, the image is convolved with a blurring filter and edge enhancer. In stage two, 120, snakelets are dropped onto the image. In stage three, 130, snakelets are eliminated from plateaus. In stage four, 140, snakelet nodes vote for face ovals. In stage five, 500, there occurs a non-maximal suppression of votes.

Figure 3:
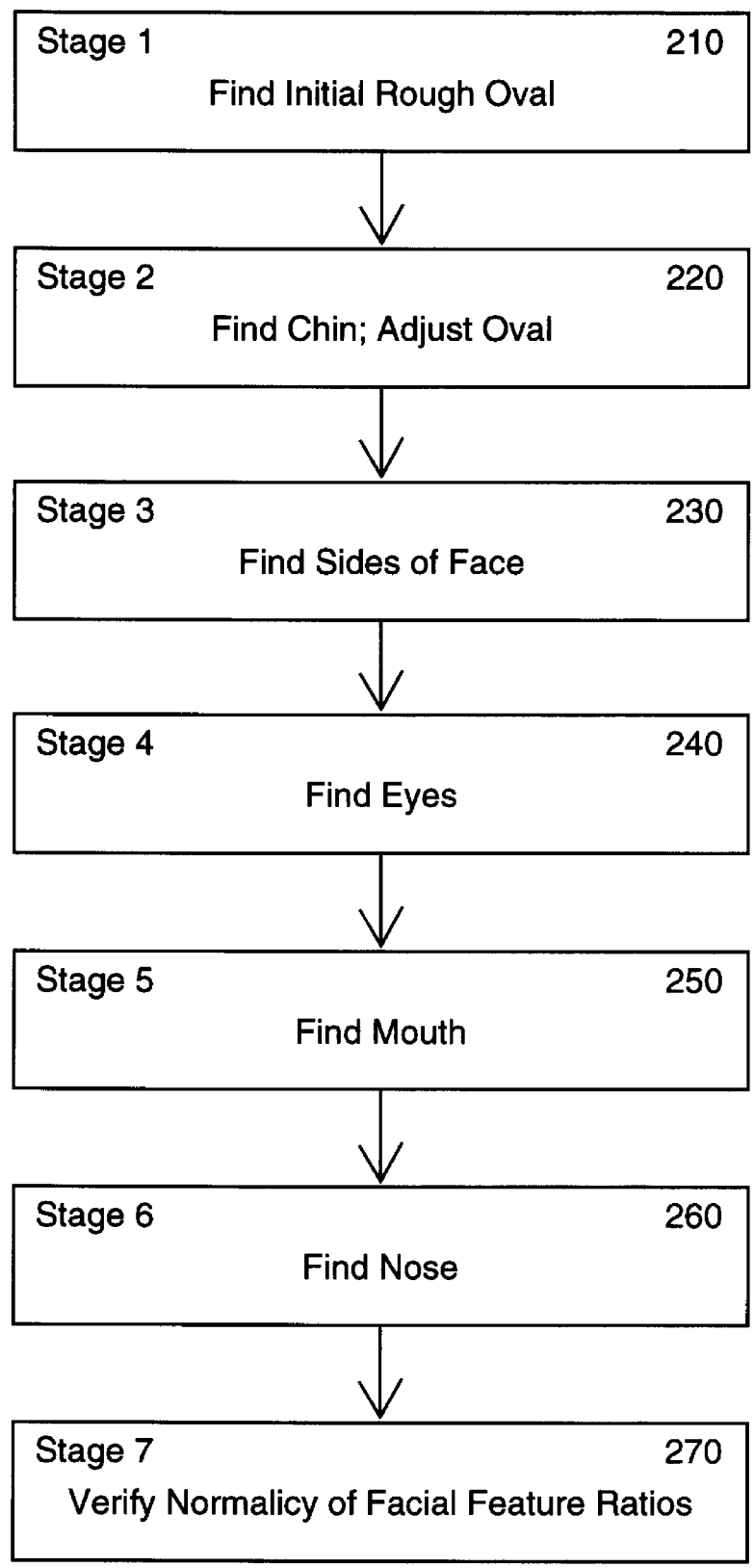
FIG. 3 illustrates the seven stages followed in step two of FIG. 1.

FIG. 3 illustrates the seven stages followed in step two of FIG. 1, where facial features in a candidate face are confirmed to exist and are broadly discussed as follows. Stage one, 210, is to find a initial rough oval about the face. Stage two, 220, is to find the chin and adjust the oval accordingly. Stage three, 230, is to find the sides of the face. Stage three, 240, is to find the eyes of the face. Stage four, 250, is to find the mouth of the face. Stage five, 260, is to find the nose of the face. Stage seven, 270, is to verify that facial features are located in typical positions.

STEP A: FIND CANDIDATE FACES

Digital images are generally two dimensional arrays of numbers that each represent the level of brightness at each pixel in the image. Referring to FIG. 2, in stage one, 110, of Step A, the digital image is prefiltered with a blurring filter and edge enhancer. A blurring filter is when you take a region of pixels from the image and take their weighted sum value and assign that result to the center of that region and do this to every possible center of a region in the image. An example is assigning all the weights to be 1/n where n is the number of pixels in the region. An edge enhancer is a filter that will increase the intensity variation near an actual edge in the image. An edge in an image is a discontinuity in the intensity of the image or in its rate of change. An example of combining both a blurring filter with an edge enhancer is described in parent application Ser. No. 08/198,816 now abandoned which is incorporated by reference, which uses a exponential filter and a morphological operator as a blurring filter and edge enhancer, respectively. Thus, the digital image is prefiltered at step one, 110 of FIG. 1, in order to enhance the edges of the image.

Referring to FIG. 2, in stage two, 120, small preselected curves sometimes referred to as snakelets, are dropped onto the image. This process has sometimes been referred to as snakes. Snakes is a method for matching a model of a curve to an actual curve in a general image. Kass M., Witkin A. and Terzopoulos D. (1988), "Snakes: Active Contour Models", International Journal of Computer Vision, pp. 321–331.

We use snakes to find pieces of curves, such as a piece of a wrinkle or a piece of a chin, or a piece of a side of a face and the like. These pieces of snakes, we call snakelets. In a digital image where intensity values in that image can be interpreted as height, a snake is a curve, representing a string of connected pixels, such that this curve will tend to adjust itself so that it falls into a local valley. Hence, such a curve is first dropped somewhere (fitting over certain pixels), then the connected curve will tend to slither down the intensity valley till it stabilizes and slithers no more. The manner in which stabilization is evaluated by adding together the intensity values beneath a snake. See FIG. 4. Then if by moving one of the points to a neighboring pixel, the sum can be decreased, the movement is carried out If the movement will increase the overall sum, it is not carried out. After all possibilities have been examined, the snake is said to be stabilized, when no more movement occurs amongst the connected pixels, and the snakes become aligned to and generally match a natural curve in the image. See FIGS. 5a–5d.

In stage two, 120, of FIG. 2, multiple snakelets are dropped in random orientations in a grid, one per grid point, in a rectangular region that spans the whole image until the snakelets have stabilized. Those snakelets that have found shallow type valleys also referred to as plateaus are eliminated in the next step.

Figure 4:
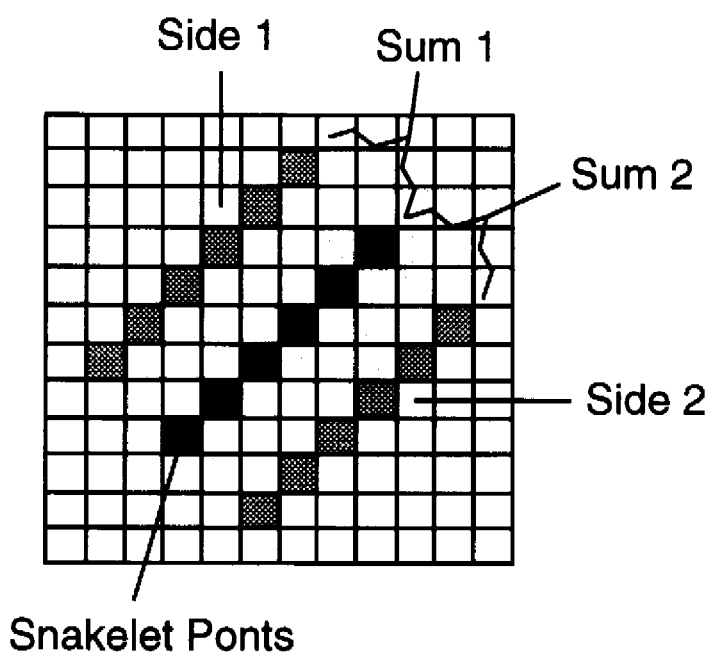
FIG. 4 shows the directional derivative orthogonal to the snakelet curve for each side of the snakelet used in stage 3 of FIG. 2.
Figure 5:
FIGS. 5a through 5d illustrate the resultant images using the five stages of FIG. 2.
Figure 5:
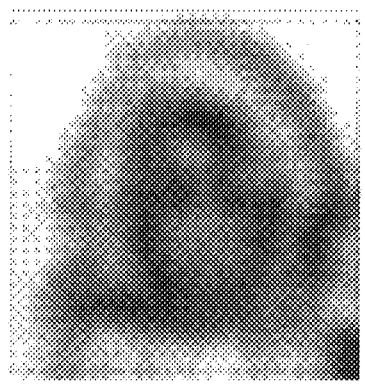
Figure 5:
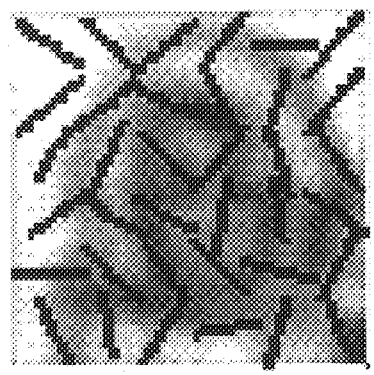
Figure 5:
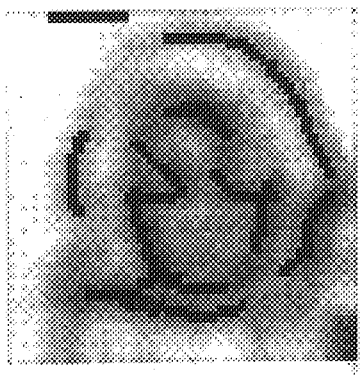

In stage three, 130, of FIG. 2, snakelets are eliminated from plateaus. In order to eliminate snakelets that do not correspond to intensity edges, shallow potential valleys in which snakelets have settled are detected. A shallow valley is detected according to the following: For each point in a snakelet, the directional derivative (of the raw image intensity) taken orthogonal to the snakelet curve is calculated. FIG. 4 shows the directional derivative orthogonal to the snakelet curve for each side of the snakelet.

Referring to FIG. 4, the snakelet points are summed separately for each side of the snakelet and normalized for the number of points in the snakelet, to obtain two sums that indicate the steepness of the valley the snakelet is occupying. If these steepness sums do not exceed some preselected threshold, the snakelet is then eliminated. In this process, only those snakelets that lie in a deep enough edge-potential valley survive. By "deep enough", we mean valleys that are not shallow.

In stage four, 140, of FIG. 2, snakelets vote for oval curves of a facial image by using a Hough Transform function. The snakelet survivors, (that is those that are in deep-enough valleys) then are used to obtain a Hough Transform for the ovals (ellipses) that the curves belong to. The Hough Transform which is used for overall voting is implemented in two stages. First, the two end-points of each snakelet vote for a center of the oval. The equations (1) and (2) for two points #$(x_1,y_1)$# and $(x_2,y_2)$ on an oval centered at $(x_c,y_c)$, as follows, $$\frac{(x_1+x_c)^2}{a^2} + \frac{(y_1+y_c)^2}{b^2} = 1 \quad (1)$$

and $$\frac{(x_2+x_c)^2}{a^2} + \frac{(y_2+y_c)^2}{b^2} = 1 \quad (2)$$

where;

$x_1$ is the horizontal coordinate of the first of two points.
$y_1$ is the vertical coordinate of the first of two points.
$x_2$ is the horizontal coordinate of the second of two points.
$y_2$ is the vertical coordinate of the second of two points.
$x_c$ is the horizontal coordinate of the center of the oval.
$y_c$ is the vertical coordinate of the center of the oval.
a is the first oval parameter.
b is the second oval parameter.

Equations (1) and (2) are combined to form equation (3) as follows:

$$b = \pm\sqrt{\frac{(y_2+y_c)^2(x_1+x_c)^2 - (y_1+y_c)^2(x_2+x_c)^2}{(x_1+x_c)^2 - (x_2+x_c)^2}} \quad (3)$$

Thus, for every pair of snakelet end-points or nodes and given a particular value for $(x_c,y_c)$. a value for "b" is computed. By dividing the possible values of "b" into several intervals, support for coarsely binned (intervals are called bins) values, of b is computed across all possible values of the center $(x_c,y_c)$. In other words, snakelet nodes vote for a face oval. After which stage five of FIG. 2 occurs In Stage five, 150, FIG. 2, non-maximal suppression is then performed on values of b. This means that for a range of possible values of b only local peaks in the votes(most popular values of "b") are recorded for subsequent processing.

Figure 6:
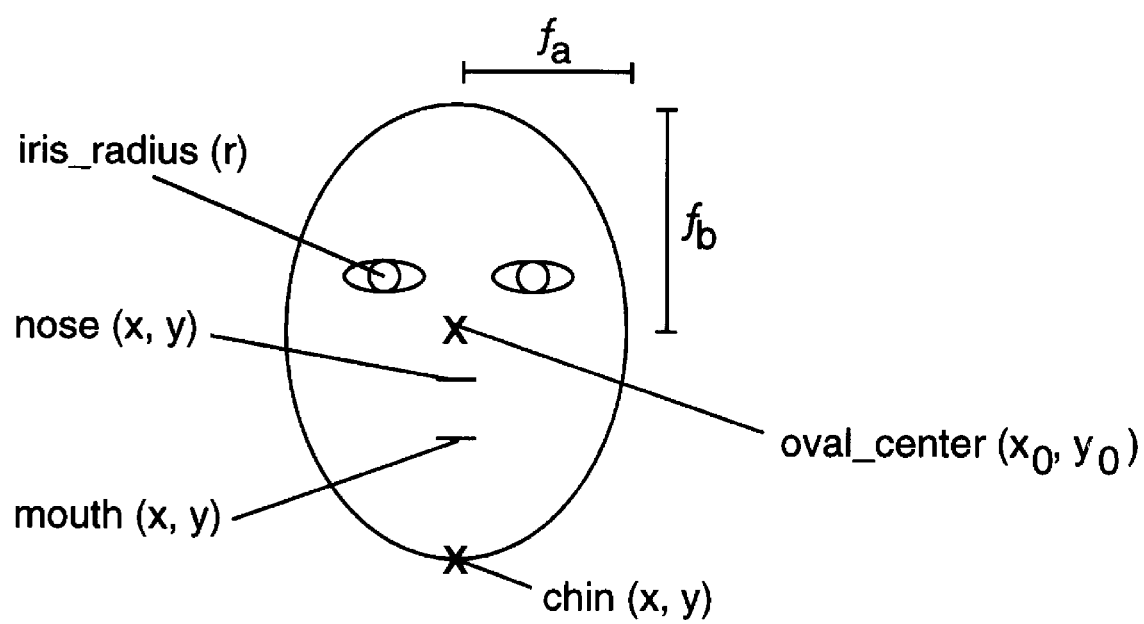
FIG. 6 shows a face template with the parameters used for oval-fitting and eye fitting.

The next part of the Hough Transform which is a voting procedure, is performed on all component points #$(x_i,y_i)$# to obtain the parameter a, according to equation (4).

$$a = \pm\sqrt{\frac{b^2(x_i+x_c)^2}{b^2 - (y_i+y_c)^2}} \quad (4)$$

where:

$x_1$ is the horizontal coordinate of the i th point.
$y_1$ is the vertical coordinate of the i th point.
intensity of the image or in its rate of change. In FIG. 6, the potential image for the edge $\phi_{edge}$ was generated by first applying a morphological operator of close(21) and then blurring it by using an exponential filter $e^{-a}(x^2+y^2)^{1/2}$ with an $\alpha$ of 0.8. A morphological operator applies an operator to an image in three steps: first the image has its similar-intensity regions broadened; second another version has its similar-intensity regions narrowed; and third, the second version is substracted from the first. The potential image for the valley (which is the region of lowest intensity in the image) was generated by first applying a morphological operator which first broadens the similar-intensity regions, and then narrows them, and then blurring it by using an exponential filter with an $\alpha$ value of 0.4.

The eye potential image is the potential image to assist finding the eye; this potential image is generated by a first difference operator of size 3, in both X and Y directions. The symbols in FIG. 6 breakdown as follows:

Oval Center (x0, y0) is the center of the oval.
fa is half the horizontal width of the oval through its center
fb is half the vertical height of the oval through its center
r is the radius of the left iris; it is also the radius of the right iris.
leye (x,y) is the center position of the left iris
reye (x,y) is the center position of the right iris
nose (x,y) is the position of the base of the nose
mouth (x,y) is the center of the mouth
chin (x,y) is the lowest point of the chin

FIND INITIAL ROUGH OVAL

The initial oval-finding stage 210 uses the edge-image potential to find the best oval that fits the image.

$$E_{oval\_total} = E_{edge} + E_{internal}$$

$$E_{edge} = \frac{c_2}{length} \int_{face\_edge} \Phi_{edge}(\vec{x}) ds$$

$$E_{internal} = k_1(X_e - X_c) + k_1(Y_e - Y_c - (0.1)f_b) + k_2(f_a - 0.7f_b) + k_3 e^{-\beta_1 f_a} + k_3 e^{-\beta_3 r}$$

The coefficients used are: $c_2$=200, $C_3$=100, $k_1$=100, $k_2$=100 000, $\beta_1$=0.04, $\beta_2$=0.028.

The oval axes half-lengths $(f_a, f_b)$, are initialized with a value and the oval is positioned inside the face perimeter. The $k_1$ term force draws the oval center downward because the oval center found in-stage 1 is biased towards the top due to the inclusion of hair in stage 1. The $k_1$ term also maintains the horizontal component of the center close to where it was initially dropped. The $k_3$ terms are an outward forcing term of each half-length to prevent the oval from becoming too small. The $k_3$ term also helps to overcome the possibility of the lower edge of the oval stabilizing around the mouth. The $k_2$ term tries to maintain a ratio that is reasonable for a face.

Figure 7:
FIGS. 7a through 7f illustrates the process followed in the oval fitting stage of FIG. 3.
Figure 7:
Figure 7:
Figure 7:
Figure 7:
Figure 7:

The fitting of the oval is performed by iteratively updating the oval center position and the oval axes half-lengths ($f_a$, $f_b$), The update formula is obtained by gradient descent with respect to these four parameters. The stage is complete when the total energy stabilizes around a minimum value. FIG. 7 illustrates the process followed in the oval fitting stage. FIG. 7a shows an original image. FIG. 7b shows the image with a negative edge potential. FIGS. 7c through 7f show the various stages of fitting the oval until a final fit has been reached.

CHIN-FINDING STAGE

The chin-finding stage 220 of FIG. 3, uses the edge-image potential to find the bottom of the chin. First, multiple snakelets are dropped in random orientations in a grid, one per grid point, in a rectangular region of width 3/2$F_a$ centered at the vertical axis of the oval center, and of height $\frac{1}{4}f_b$ to the top and $\frac{1}{8}f_b$ to the bottom positioned from the horizontal axis tangent to the bottom of the oval.

Snakes is a method for matching a model of a curve to a curve in a general image. Kass M., Witkin A. and Terzopoulos D. (1988), "Snakes: Active contour models", International Journal of Computer Vision, pp. 321–331. We use snakes to find pieces of curves, such as a piece of a wrinkle or a piece of a chin, or a piece of a side of a face. These pieces of snakes, we call snakelets.

After all the snakelets have stabilized, they are used to obtain a voting scheme for the strongest parabola in that region. The voting scheme is implemented in two stages. First, each snakelet votes for a coarse candidate position for the base of the parabola. Non-maximal suppression is performed on these votes, and the best five are chosen. Amongst these five, the one that is located in the highest position on the face (to eliminate parabolas corresponding to necklines of clothing, or of the shadow formed by the chin) is chosen. Then, the snakelets that voted for this winning position of the base are identified, and a finer search of the base is performed in a similar manner.

This leads to detection of the chin, when it is delineated in the raw image. If the image quality is poor, or illumination conditions are bad, the correct position of the chin is very difficult to find.

Determination of whether a chin is found is currently done by human visual inspection. If it has been found, it is used in three places: to refine the initial oval; to find the virtual top of the head using also the sides of the face (see upcoming sections on "Face Side-finding stage" and "Finding the virtual top of the head"); and to be used in ratios 3a and 5a. If it is determined that it is not found, the bottom of the initial oval is used in the ratios, thus requiring ratios 3b and 5b. In these ratios, the chin is referred as "ochin" (for oval-chin).

Figure 8:
FIGS. 8a through 8f illustrates the various stages followed in a chin finding procedure of FIG. 3.
Figure 8:
Figure 8:
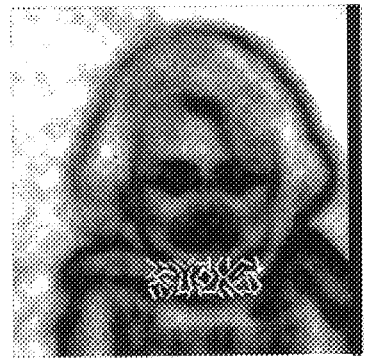
Figure 8:
Figure 8:
Figure 8:

FIG. 8 illustrates the various stages followed in a chin finding procedure. FIG. 8a shows an original image. FIG. 8b shows the image with a negative of edge potential. FIG. 8c shows the image after snakelets have been dropped. FIG. 8d shows the image with snakelets at an intermediate stage. FIG. 8e shows the snakelets in a stabilized form. FIG. 8f shows the winner in Hough space marked with and "X", which signifies the chin in the image.

FACE SIDE-FINDING STAGE

Figure 9:
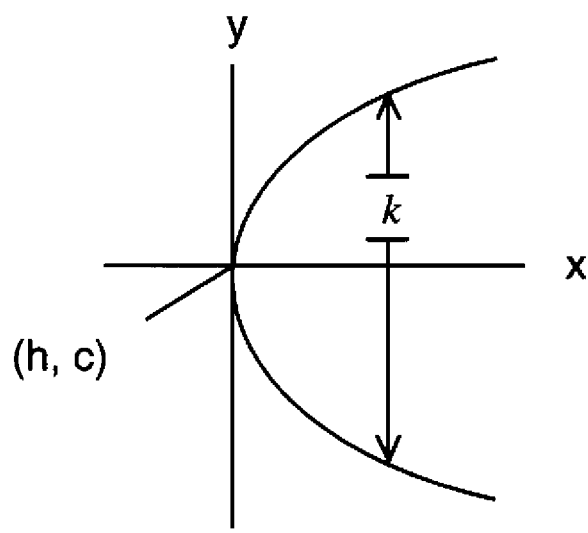
FIGS. 9a and 9b, respectively shows the right and left open-ended parabolas.
Figure 9:
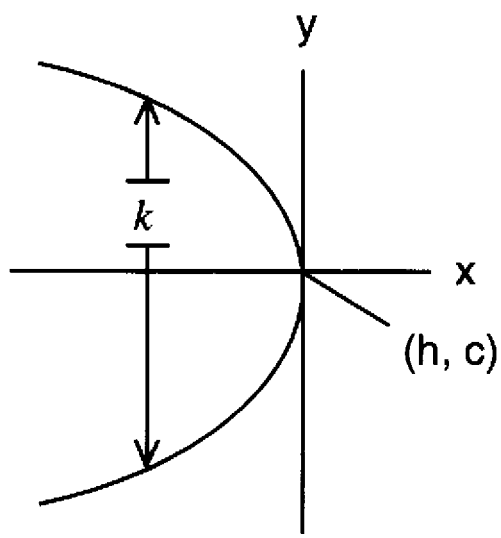

The face side-finding stage 230 of FIG. 3, uses the edge-image potential to find the left and right sides of the face. This stage uses the parabola-fitting algorithm, except that the parabola equations are modified to suit the left and right open-ended parabolas. FIGS. 9a and 9b shows the right and left open-ended parabolas. FIG. 9a shows a right open-ended parabola used to fit the left side of a face. FIG. 9b shows a left open-ended parabola that is used to fit the right side of a face. The parabola-fitting algorithm is as follows:

for all snakelets { for $h = h_{min}$ to $h_{max}$ {

/* $(x_1, y_1)$ and $(x_2, y_2)$ are two end points of the snakelet; */

$c = (x_2 - h)^2 y_1 - (x_1 - h)^2 y_2 / (x_2 - h)^2 - (x_1 - h)^2;$

BIN[$h$, $c$] ++; /* Increment bin */

}

}

-continued

Perform Non-Maxima suppression;

(keep only the local peaks)

Select the 5 local maxima and rank them in descending order;

Select the winning bin, which is BIN[$h$, $c$];

Extract the snakelets that voted for the winning bin, for later use;

For the right open-ended parabola of FIG. 9a, the parabola equation is:

$$x = k(y-c)^2 + h$$

For the left open-ended parabola of FIG. 9b, the parabola equation is:

$$x = -k(y-c)^2 + h$$

Figure 10:
FIGS. 10a through 10e illustrates the changes followed in locating the left and right sides of the face used in FIG. 3.
Figure 10:
Figure 10:
Figure 10:
Figure 10:

FIG. 10 illustrates the changes followed in locating the left and right sides of the face. This process works even under conditions that are not ideal, except when the ear is too close to the side of the face, or when there is dishevelled hair below the lower half of the face. FIG. 10a shows the original image. FIG. 10b shows the negative of the edge-image potential. FIG. 10c shows a rectangular grid of randomly oriented snakelets dropped on each side of the initial oval. FIG. 10d shows the image with the snakelets settling down. FIG. 10e shows the symbol "X" on each side that marks the base point of the parabola for that side of the face.

FINDING THE VIRTUAL TOP OF THE HEAD

Computing the virtual top of head in stage 240 of FIG. 3 is very difficult to estimate when the person has hair on their head. Hence, an alternative strategy is used here.

At this stage, the three pools of snakelets that voted for winning parabolas in FIG. 10e are pooled, and a single oval is fit to all the snakelets' points. The oval is used to find the virtual top of the head, as confined by the snakelets that supported the parabolas of the chin and sides of the face. The purpose of this is to have an estimate of the ratio of the height of the eyes from the chin, relative to the virtual top of the head. This process can be affected by the errors in finding the sides of the face, which in turn are affected by dishevelled hair in the lower half of the face, and a ear that is too close to the side of the face.

Figure 11:
FIGS. 11a through 11f shows the outcome for finding a virtual head of FIG. 3 from an original image.
Figure 11:
Figure 11:
Figure 11:
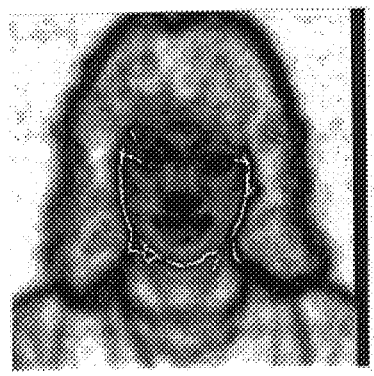
Figure 11:
Figure 11:

FIGS. 11a through 11f shows the outcome for one of the successful cases. FIG. 11a shows an original image. FIG. 11b shows the negative of edge potential of that image. FIG. 11c shows original snakelets dropped for the chin and the sides of face. FIG. 11d shows the snakelets after they have settled down. FIG. 11e shows snakelets that support the three parabolas. FIG. 11f shows that the fit of the face-oval has been refined. Wherein the virtual top of the head is the top of the oval shown in FIG. 11f.

The following is a numerical description of the process of estimating the oval for the virtual top of the head. The parametric form of the oval equation is as follows:

$$x = f_a * \cos\theta + x_0$$

$$y = f_b * \sin\theta + y_0$$

where $(x_0, y_0)$ = oval-center, $(x, y)$ = point on the oval-edge, $\theta$ = angle from the x-axis, $(f_a, f_b)$ = the respective x and y distances from the oval-center Given (x, y), (x$_0$, y$_0$) and f$_b$, we can solve for f$_a$:

$$\theta = \sin^{-1}[(y-y_0)/f_b]$$

$$f_a = (x-x_0)/\cos\theta$$

Figure 12:
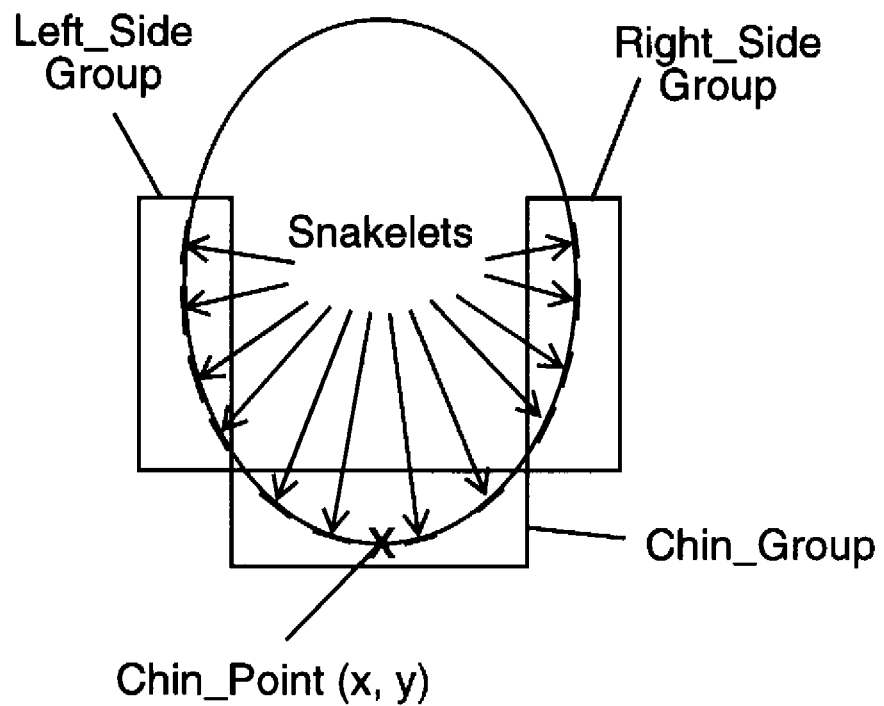
FIG. 12 shows the snakelets and chin-point that is used in the virtual top of head finding algorithm used in one of the stages of FIG. 3.

FIG. 12 shows the snakelets and chin_point that is used in the virtual top of head finding algorithm used in one of the stages of FIG. 3. FIG. 12 shows the resulting snakelets of the parabola-fitting for the three groups. These snakelets are then used as an input to the virtual top of the head finding algorithm. The algorithm for finding the virtual top of the head is as follows:

```
Perform parabola fitting for chin, left and right sides of the face;
/* As a result from parabola fitting, we have all the snakelets that
contributed to the three parabola groups and a chin point (x, y)
from
the chin parabola. */
/* The chin point (x, y) serves as the base of the oval */
for all snakelets {
    for each snakelet point SP_i {
        /* SP_i(x, y) = current point under consideration (known) */
        /* x_0 = x from the chin point (x, y) */
        for y_0 = y_min to y_max {
            f_b = y_0 - chin(y); /* y from the chin point (x, y) */
            θ = sin^-1[(y - y_0)/ f_b];
            f_a = (x - x_0)/cos(θ);
            BIN[y_0, f_a]++ ; /* increment bin */
        }
    }
}
Perform Non-Maxima suppression;
Select the 5 local maxima and rank them in descending order;
Select the winning bin – BIN[y_0, f_a];
```

EYE-FINDING STAGE

The eye-finding stage 250 of FIG. 3 consists of an iris-attracting sub-stage and an iris-fitting substage.

The iris-attracting sub-stage places both the left and the right iris center of the template (FIG. 6) near the respective iris centers in the image specified by the oval parameter.

Using the parameters from the refined oval (or the initial oval), both the left and the right iris centers of the template are placed near the respective irises in the image. The left iris center is placed $\frac{1}{10}f_b$ above oval center for y and $\frac{1}{2}f_a$ left of the oval center for x. Similarly, the right iris center is placed $\frac{1}{10}f_b$ above oval center for y and $\frac{1}{2}f_a$ right of the oval center for x. The iris-attracting stage uses the valley image potential $\phi_{valley}$ and the intensity image potential $\phi_{intensity}$ to attract both left and right iris centers to their true positions.

$$E_{eye\_total} = E_{intensity} + E_{valley} + E_{eye}$$

$$E_{intensity} = -\frac{c_5}{area}\iint_{left\_iris\_area}\Phi_{intensity}(\vec{x})dA$$
$$-\frac{c_5}{area}\iint_{right\_iris\_area}\Phi_{intensity}(\vec{x})dA$$

$$E_{valley} = -\frac{c_5}{area}\iint_{left\_iris\_area}\Phi_{valley}(\vec{x})dA$$
$$-\frac{c_5}{area}\iint_{right\_iris\_area}\Phi_{valley}(\vec{x})dA$$

$$E_{eye} = -\frac{c_4}{length}\int_{left\_iris\_edge}\Phi_{eye}(\vec{x})ds +$$
$$-\frac{c_4}{length}\int_{right\_iris\_edge}\Phi_{eye}(\vec{x})ds$$

The coefficients used are: $c_4=100$, $c_5=300$.

The iris centers are initially positioned, guided by the oval parameters. The valley potential is strong around the actual iris area and it draws the iris/eye template over a substantial distance. The update is by gradient descent which is a procedure that changes the parameters in such a manner that causes the strongest possible decrease in the $E_{eye\_total}$. The oval parameters are not allowed to change in this stage. Thus, only a change in the iris parameters will update the total energy value.

For the his-fitting substage, the equations from the Iris-attracting stage and additional equations for each of the energy potentials are used. Also an internal energy term is introduced to prevent the iris radius from collapsing to a point. The equations used are as follows:

$$E_{iris\_total}=E_{intensity\_total}+E_{valley\_total}+E_{eye\_total}E_{internal}$$

$$E_{intensity\_total}=E_{intensity\_eye}+E_{intensity\_iris}$$

$$E_{valley\_total}=E_{valley\_eye}+E_{valley\_iris}$$

$$E_{eye\_total}=E_{eye\_eye}+E_{eye\_iris}$$

$E_{intensity\_eye}$ same as in Iris-attracting stage $$E_{intensity\_iris} = -\frac{2 \times c_9}{r \times length}\int_{left\_iris\_edge}\Phi_{intensity}(\vec{x})ds +$$
$$-\frac{2 \times c_9}{r \times area}\iint_{left\_iris\_area}Phi_{intensity}(\vec{x})dA$$

$E_{valley\_eye}$ same as Iris-attracting stage $$E_{valley\_iris} = -\frac{2 \times c_8}{r \times length}\int_{left\_iris\_edge}\Phi_{valley}(\vec{x})ds -$$
$$-\frac{2 \times c_8}{r \times area}\iint_{left\_iris\_area}Phi_{valley}(\vec{x})dA$$

$E_{eye\_eye}$ same as in Iris-attracting stage $$E_{eye\_iris} = \frac{c_7}{\text{length}} \int_{\text{left\_iris\_edge}} \Phi_{eye}(\vec{x}) ds$$

$$E_{internal} = k_4 e^{-\beta_3 r}$$

The coefficients used are: $c_4=100$, $c_5=300$, $C_7=200$, $c_8=100$, $c_9=150$, $k_4=80000$, $\beta_3=0.6$.

The iris-fitting sub-stage uses the intensity image potential $\phi_{intensity}$, the valley image potential $\phi_{valley}$, the eye image potential $\phi_{eye}$ to fit the iris template to the actual image. The $k_4$ term is an outward force that prevents the radius of the iris from becoming too small. The darkness of the iris area from the intensity image and the brightness of the iris area from the valley image potential along with the iris edge information from the eye image potential will guide the fitting of the iris template to the image. The eye parameters a, b, c (these are constants controlling the boundary of the eye) are scaled with respect to the radius of the iris and these parameters are used to clip the iris disc to a partial disc. The only parameters allowed to change in this stage are both the iris centers and the scale of the iris template. The parameters are updated by gradient descent.

Figure 13:
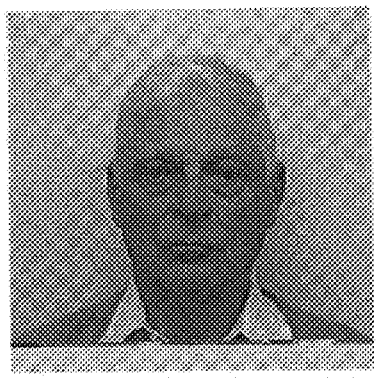
FIGS. 13a through 13i shows the various levels of the Iris-attracting and fitting stage.
Figure 13:
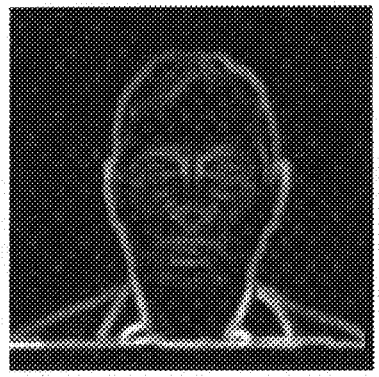
Figure 13:
Figure 13:
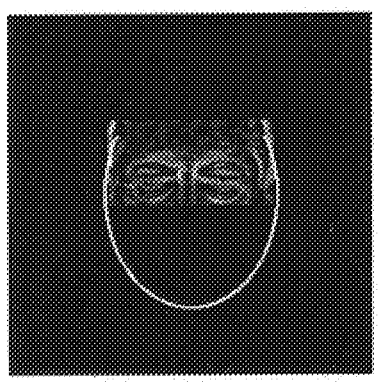
Figure 13:
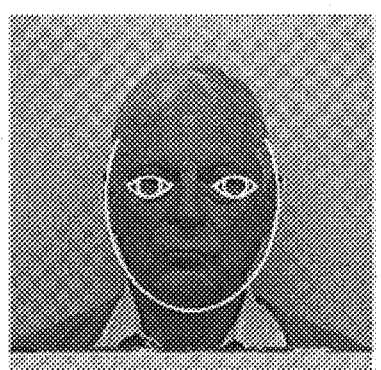
Figure 13:
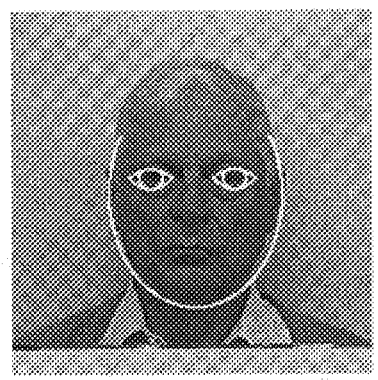
Figure 13:
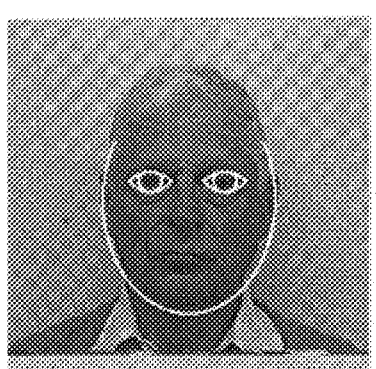
Figure 13:
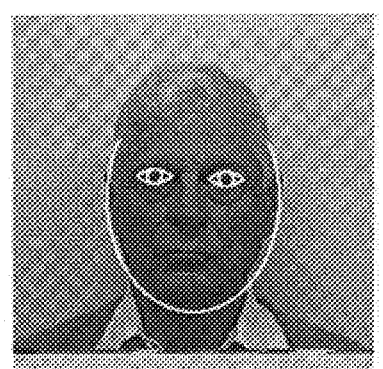
Figure 13:
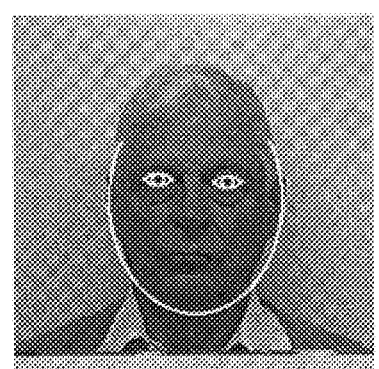

FIG. 13a through 13i shows the outcome of the iris-attracting and fitting substages. FIG. 13a shows an original image. FIG. 13b shows an edge potential of that image. FIG. 13c shows the valley potential. FIG. 13d shows the edge potential shown just for eyes. FIGS. 13e through 13g shows the iris attracting sub-stage. FIGS. 13h through 13i shows the substage for iris-fitting.

FINDING THE MOUTH

Figure 14:
FIGS. 14a through 14d shows the outcome of locating the center of the mouth, and the bottom of the nose.
Figure 14:
Figure 14:
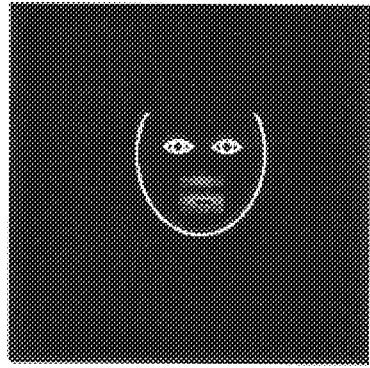
Figure 14:
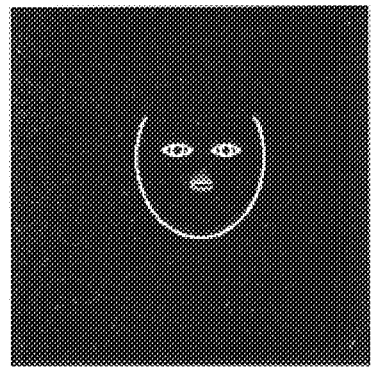

Stage250 of FIG. 3 covers finding the mouth (as shown in the template of FIG. 6) as the next stage. After finding both iris centers, a vertical axis half way between the two irises is computed. The search area for the mouth is determined by a rectangular region of width $\frac{4}{3}f_a$, centered at the vertical axis, and of height $0.5f_b$ centered at $0.5f_b$ from the bottom of the oval. This area is large enough so that the mouth is guaranteed to be within this region. An averaging filter which takes the average of the numbers it is processing, with mask size of (31×5) is convolved with the mouth area to produce the mouth image potential $\phi_{mouth}$ which is just the output from applying the averaging filter above. From the mouth image potential, each horizontal line is summed and the one with the maximum sum is selected as the position of the center of the mouth. FIG. 14 to be discussed in the next section details the outcome of locating the center of the mouth.

FINDING THE NOSE

After the mouth is found, the next stage is finding the nose 260 FIG. 3. Here, an area for the nose (as shown in the template of FIG. 6) is determined guided by the vertical axis, the mouth, and the eye. The nose is searched for in a rectangular region bounded vertically by the middle 60% of the distance between the eyes and the mouth, and horizontally by the 2 eye-centers. Similar to the mouth stage, an averaging filter with mask size (31×5)) is applied to the nose area to produce a nose image potential # From the nose image potential, each horizontal line is summed and the one with the maximum is selected as the position of the bottom of the nose. The mask size will vary with the oval size.

FIGS. 14a through 14d shows the outcome of locating the center of the mouth, and the bottom of the nose. FIG. 14a shows an original image. FIG. 14b shows a final mouth and nose-fit over the original image. FIG. 14c shows an enlarged mouth potential from the image. FIG. 14d shows an enlarged nose potential from the image.

Figure 18:
FIGS. 18a through 18v shows the original image for the adult and senior class.
Figure 18:
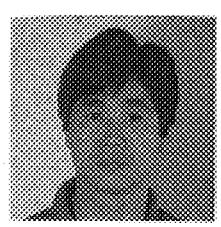
Figure 18:
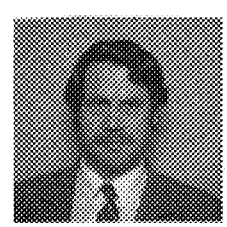
Figure 18:
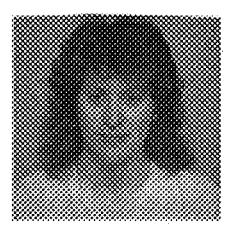
Figure 18:
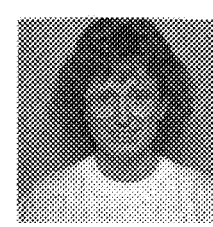
Figure 18:
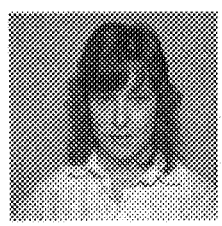
Figure 18:
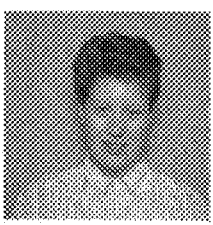
Figure 18:
Figure 18:
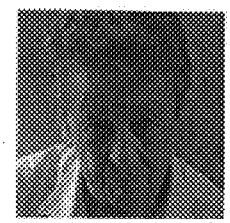
Figure 18:
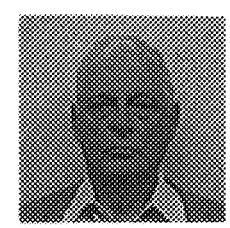
Figure 18:
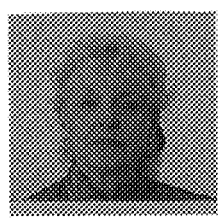
Figure 18:
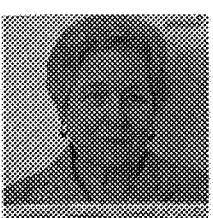
Figure 18:
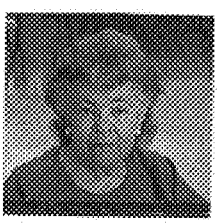
Figure 18:
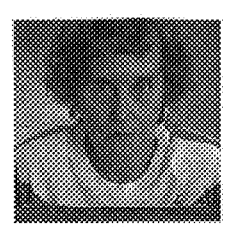
Figure 18:
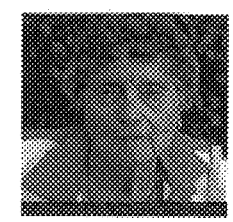
Figure 18:
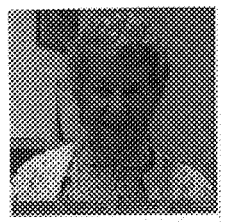
Figure 18:
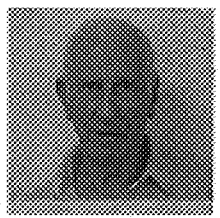
Figure 18:
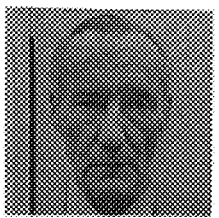
Figure 18:
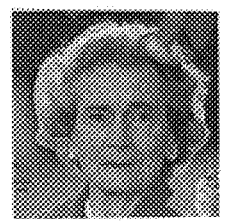
Figure 18:
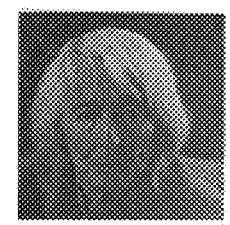
Figure 18:
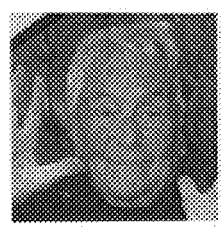
Figure 18:
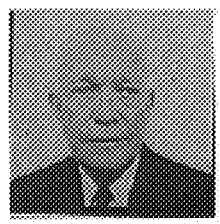
Figure 19:
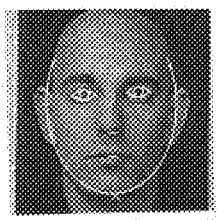
FIGS. 19a through 19v shows the final fit for the adult and senior class of FIGS. 18a through 18v.
Figure 19:
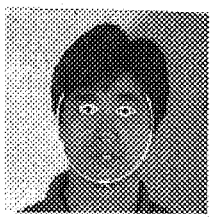
Figure 19:
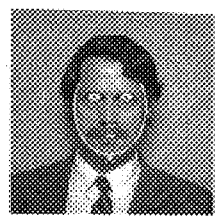
Figure 19:
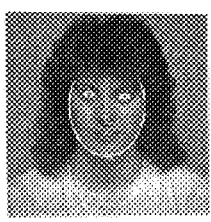
Figure 19:
Figure 19:
Figure 19:
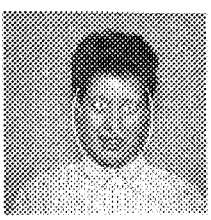
Figure 19:
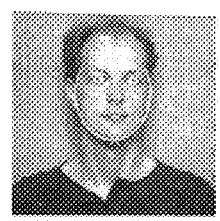
Figure 19:
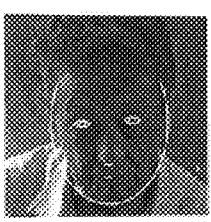
Figure 19:
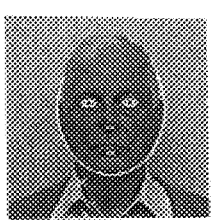
Figure 19:
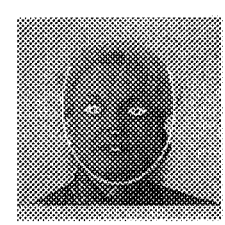
Figure 19:
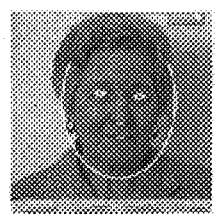
Figure 19:
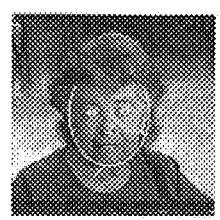
Figure 19:
Figure 19:
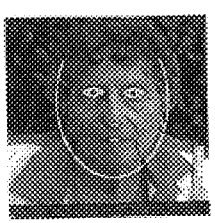
Figure 19:
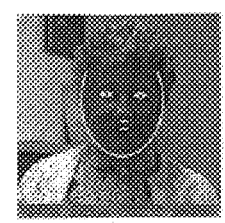
Figure 19:
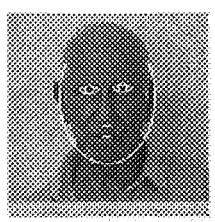
Figure 19:
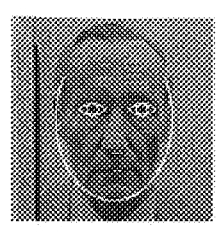
Figure 19:
Figure 19:
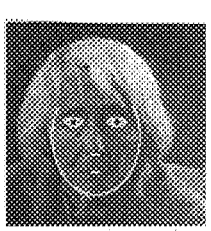
Figure 19:
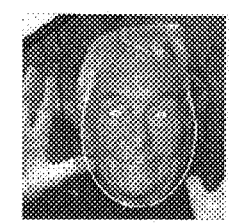
Figure 19:
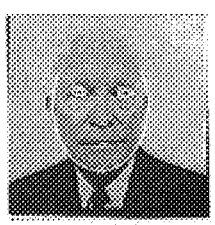

VERIFY NORMALICY OF FACIAL FEATURE STAGE:

The results obtained from facial feature detection, which encompass stages 210 through 270 in FIG. 3 are categorized in tables. Tables I and 2 show the positions detected for the various primary facial features. For the columns labelled oval, leye, reye, nose, mouth, chin, the values of x and y represent the coordinates that are measured in pixel units. The values of fa and fb in the column labelled oval represent the measured half-lengths of the oval in pixel units. Tables 3 and 4 indicate human evaluation of these results. All the faces used in these experiments are shown with their facial feature fits in FIGS. 16 through 19. FIGS. 16a through 16y show the original images for the baby class. FIGS. 17a through 17y show the final fit for each of the images of FIGS. 16a through 16y. FIGS. 18a through 18v show the original images for the adult and senior class. FIGS. 19a through 19v show the final fit for each of the images of FIGS. 18a through 18v. These evaluations are used to decide which data to include in evaluating whether a ratio is appropriate for classification. Here, the candidate face is judged for its facial feature ratios, to see if these ratios fall into the range acceptable for the range of babies to adults. If the computed ratios agree with the pre-known ratios, then the candidate face is accepted.

TABLE 1

Results of the facial feature data found for baby class.

| subject | oval x | oval y | leye x | leye y | reye x | reye y | nose x | nose y | mouth x | mouth y | chin x | chin y | oval $f_a$ | oval $f_b$ |
|---|---|---|---|---|---|---|---|---|---|---|---|---|---|---|
| baby01 | 140 | 105 | 113 | 106 | 165 | 110 | 139 | 73 | 139 | 52 | 146 | 19 | 61 | 85 |
| baby02 | 143 | 118 | 114 | 139 | 174 | 135 | 144 | 98 | 144 | 76 | 142 | 40 | 59 | 77 |
| baby03 | 134 | 145 | 117 | 152 | 151 | 152 | 134 | 128 | 134 | 114 | 132 | 93 | 43 | 57 |
| baby04 | 131 | 125 | 109 | 138 | 151 | 136 | 130 | 109 | 130 | 92 | 131 | 64 | 46 | 60 |
| baby05 | 140 | 119 | 120 | 131 | 164 | 131 | 142 | 97 | 142 | 84 | 142 | 55 | 49 | 65 |
| baby08 | 122 | 122 | 92 | 120 | 146 | 120 | 119 | 80 | 119 | 58 | 113 | 21 | 72 | 100 |
| baby10 | — | — | 110 | 115 | 166 | 115 | 138 | 79 | 138 | 58 | — | — | — | — |
| baby12 | 129 | 95 | 104 | 104 | 154 | 100 | 129 | 70 | 129 | 49 | — | — | 64 | 84 |
| baby13 | 131 | 127 | 107 | 139 | 153 | 139 | 130 | 110 | 130 | 91 | — | — | 52 | 62 |
| baby14 | 95 | 149 | 73 | 157 | 115 | 155 | 94 | 127 | 94 | 110 | 83 | 86 | 49 | 65 |
| baby15 | — | — | 107 | 112 | 157 | 114 | 132 | 80 | 132 | 60 | — | — | — | — |
| baby16 | — | — | 114 | 135 | 158 | 133 | 136 | 105 | 136 | 89 | — | — | — | — |
| baby17 | 133 | 118 | 109 | 118 | 163 | 116 | 136 | 82 | 136 | 58 | — | — | 67 | 91 |
| baby18 | 142 | 125 | 116 | 137 | 168 | 137 | 142 | 99 | 142 | 75 | 144 | 37 | 61 | 85 |

TABLE 1-continued

Results of the facial feature data found for baby class.

| subject | oval x | oval y | leye x | leye y | reye x | reye y | nose x | nose y | mouth x | mouth y | chin x | chin y | oval $f_a$ | oval $f_b$ |
|---|---|---|---|---|---|---|---|---|---|---|---|---|---|---|
| baby19 | — | — | 113 | 141 | 167 | 141 | 140 | 115 | 140 | 88 | — | — | — | — |
| baby20 | 136 | 121 | 114 | 118 | 158 | 122 | 136 | 93 | 136 | 74 | 129 | 54 | 52 | 70 |
| baby21 | — | — | 100 | 137 | 152 | 139 | 126 | 108 | 126 | 85 | — | — | — | — |
| baby22 | 131 | 138 | 112 | 149 | 152 | 147 | 132 | 120 | 132 | 105 | — | — | 48 | 66 |
| baby24 | 142 | 123 | 125 | 129 | 177 | 131 | 151 | 100 | 151 | 84 | 152 | 44 | 57 | 79 |
| baby25 | — | — | 94 | 122 | 148 | 120 | 121 | 91 | 121 | 66 | — | — | — | — |
| b02 | — | — | 106 | 128 | 154 | 128 | 130 | 97 | 130 | 73 | — | — | — | — |
| b06 | — | — | 120 | 143 | 166 | 145 | 143 | 111 | 143 | 93 | 145 | 55 | 63 | 87 |
| b07 | 145 | 119 | 131 | 117 | 179 | 117 | 155 | 84 | 155 | 64 | — | — | 72 | 88 |
| b09 | — | — | 92 | 136 | 146 | 136 | 119 | 105 | 119 | 85 | — | — | — | — |
| b18 | — | — | 84 | 157 | 124 | 159 | 104 | 135 | 104 | 118 | — | — | — | — |

TABLE 2

Results of the facial feature data found for adult and senior classes.

| subject | oval x | oval y | leye x | leye y | reye x | reye y | nose x | nose y | mouth x | mouth y | chin x | chin y | oval $f_a$ | oval $f_b$ |
|---|---|---|---|---|---|---|---|---|---|---|---|---|---|---|
| snr01 | 131 | 117 | 97 | 115 | 159 | 119 | 128 | 65 | 128 | 49 | — | — | 73 | 103 |
| snr02 | 131 | 137 | 103 | 144 | 155 | 144 | 129 | 114 | — | — | — | — | 67 | 83 |
| snr03 | — | — | 96 | 138 | — | — | 123 | 111 | 123 | 89 | — | — | — | — |
| snr05 | — | — | 114 | 151 | 164 | 147 | 139 | 114 | 139 | 96 | — | — | — | — |
| snr06 | 123 | 128 | 101 | 129 | 143 | 131 | 122 | 105 | 122 | 87 | — | — | 50 | 66 |
| snr07 | 131 | 157 | — | — | — | — | 134 | 126 | 134 | 107 | — | — | 54 | 76 |
| snr10 | — | — | — | — | 159 | 155 | 134 | 116 | 134 | 97 | — | — | — | — |
| snr11 | 132 | 147 | 113 | 154 | 155 | 152 | — | — | 134 | 111 | — | — | 51 | 71 |
| snr15 | 128 | 149 | 105 | 158 | 147 | 160 | — | — | 126 | 100 | — | — | 60 | 84 |
| snr18 | 131 | 128 | 104 | 139 | 166 | 139 | 135 | 85 | 135 | 63 | — | — | 73 | 103 |
| s01 | 134 | 107 | 107 | 125 | 163 | 125 | 135 | 87 | 135 | 65 | 146 | 31 | 59 | 81 |
| s10 | 115 | 111 | 87 | 129 | 141 | 129 | 114 | 89 | 114 | 67 | 102 | 38 | 55 | 73 |
| s11 | — | — | 119 | 132 | 175 | 130 | 147 | 92 | 147 | 72 | — | — | — | — |
| s12 | 120 | 142 | 94 | 158 | 152 | 156 | 123 | 119 | 123 | 95 | 120 | 61 | 60 | 82 |
| adult01 | 129 | 136 | 95 | 147 | 163 | 149 | 129 | 100 | 129 | 70 | 131 | 20 | 81 | 113 |
| adult04 | 126 | 112 | 106 | 129 | 152 | 127 | 129 | 92 | 129 | 70 | 126 | 37 | 60 | 74 |
| a01 | — | — | 104 | 146 | 144 | 146 | 124 | 112 | 124 | 98 | 123 | 69 | 45 | 59 |
| a02 | 125 | 137 | 103 | 152 | 147 | 148 | 125 | 116 | 125 | 103 | 127 | 73 | 47 | 63 |
| a04 | 132 | 140 | 110 | 153 | 150 | 155 | 130 | 121 | 130 | 111 | 133 | 80 | 49 | 59 |
| a06 | 139 | 132 | 118 | 152 | 158 | 152 | 138 | 116 | 138 | 103 | 140 | 76 | 41 | 53 |
| a12 | — | — | 123 | 136 | 159 | 132 | 141 | 104 | 141 | 92 | — | — | — | — |
| a19 | 126 | 153 | 107 | 170 | 151 | 168 | 129 | 142 | 129 | 124 | 128 | 94 | 47 | 59 |

TABLE 3

Results indicating how well the facial feature fits were for the baby class. The quality of these fits were judged by human inspection. An automatic procedure for this appears to be difficult to design.

| subject | oval | leye | reye | nose | mouth | chin | comments |
|---|---|---|---|---|---|---|---|
| baby01 | VG | VG | VG | VG | VG | VG | None |
| baby02 | VG | VG | VG | VG | VG | VG | None |
| baby03 | VG | VG | VG | VG | VG | VG | None |
| baby04 | VG | VG | VG | VG | VG | VG | None |
| baby05 | VG | G | G | VG | VG | VG | None |
| baby08 | VG | VG | VG | VG | VG | VG | +5 deg, OMF |
| baby10 | P | VG | VG | VG | P | VG | None |
| baby12 | VG | VG | VG | VG | VG | CNF, UO | Expr, OMF |
| baby13 | VG | VG | VG | VG | VG | CNF, UO | OMF |
| baby14 | VG | VG | VG | VG | VG | G | None |
| baby15 | P | VG | VG | VG | VG | P | None |
| baby16 | P | VG | VG | VG | VG | P | +2 deg |
| baby17 | VG | VG | VG | VG | VG | CNF, UO | +2 deg |
| baby18 | VG | VG | VG | VG | VG | G | None |
| baby19 | P | VG | VG | VG | VG | P | None |
| baby20 | VG | VG | VG | VG | VG | G | None |
| baby21 | P | G | G | VG | VG | P | None |
| baby22 | G | VG | VG | VG | VG | CNF, UO | None |
| baby24 | G | VG | VG | VG | VG | G | +3 deg |
| baby25 | P | G | VG | VG | VG | P | +3 deg |
| b02 | P | G | VG | VG | VG | P | None |
| b06 | P | G | G | VG | VG | VG | +1 deg |
| b07 | VG | VG | VG | VG | VG | P, UO | +1 deg |

TABLE 3-continued

Results indicating how well the facial feature fits were for the baby class. The quality of these fits were judged by human inspection. An automatic procedure for this appears to be difficult to design.

| subject | oval | leye | reye | nose | mouth | chin | comments |
|---------|------|------|------|------|-------|------|----------|
| b09 | P | VG | VG | VG | VG | P | +1 deg |
| b18 | P | VG | VG | VG | VG | P | +2 deg |

VG = Very Good,
G = Good,
P = Poor,
UO = Use Oval to compute chin,
CNF = Chin Not Found
OMF = Oval Manually Found
+x deg = amount of rotation of the face

TABLE 4

Results indicating how well the facial feature fits were for the adult and senior classes. The quality of these fits were judged by human inspection. An automatic procedure for this appears to be difficult to design.

| subject | oval | leye | reye | nose | mouth | chin | comments |
|---------|------|------|------|------|-------|------|----------|
| snr01 | VG | VG | VG | G | VG | CNF, UO | None |
| snr02 | VG | VG | VG | VG | P | CNF, UO | None |
| snr03 | P | VG | P | VG | VG | P | None |
| snr05 | P | VG | G | VG | VG | P | +2 deg |
| snr06 | VG | VG | VG | VG | VG | CNF, UO | None |
| snr07 | VG | P | P | VG | VG | CNF, UO | None |
| snr10 | P | P | G | VG | VG | P | None |
| snr11 | G | G | VG | P | VG | CNF, UO | Expr |
| snr15 | VG | VG | G | P | VG | CNF, UO | None |
| snr18 | VG | VG | G | G | VG | CNF, UO | None |
| s01 | VG | VG | G | VG | VG | G | None |
| s10 | G | VG | VG | VG | VG | G | None |
| s11 | P | VG | VG | VG | VG | P | Expr |
| s12 | VG | G | VG | VG | VG | G | None |
| adult01 | G | VG | VG | VG | VG | VG | None |
| adult04 | VG | VG | VG | VG | VG | VG | None |
| a01 | P | VG | VG | VG | VG | VG | None |
| a02 | G | VG | VG | VG | VG | VG | None |
| a04 | VG | VG | VG | VG | VG | VG | Expr |
| a06 | G | G | G | G | VG | VG | None |
| a12 | P | VG | VG | G | VG | P | Expr |
| a19 | VG | VG | VG | VG | VG | VG | None |

VG = Very Good,
G = Good,
P = Poor,
UO = Use Oval to compute chin,
CNF = Chin Not Found
OMF = Oval Manually Found
+x deg = amount of rotation of the face After the primary facial features have been located, they can be used to compute the ratios for age classification: Six ratios are evaluated as shown in FIGS. 15*a* through 15*b*. The term "abs()" signifies the absolute value within.

In FIG. 15a, RATIO 1 is $\dfrac{abs(leye(x) - reye(x))}{abs\left(\dfrac{leye(y) + reye(y)}{2} - nose(y)\right)}$ In FIG. 15b, RATIO 2 is $\dfrac{abs(leye(x) - reye(x))}{abs\left(\dfrac{leye(y) + reye(y)}{2} - mouth(y)\right)}$ In FIG. 15c, RATIO 3 is $\dfrac{abs(leye(x) - reye(x))}{abs\left(\dfrac{leye(y) + reye(y)}{2} - chin(y)\right)}$ In FIG. 15d, RATIO 4 is $\dfrac{abs\left(\dfrac{leye(y) + reye(y)}{2} - nose(y)\right)}{abs\left(\dfrac{leye(y) + reye(y)}{2} - mouth(y)\right)}$ In FIG. 15e, RATIO 5 is $\dfrac{abs\left(\dfrac{leye(y) + reye(y)}{2} - mouth(y)\right)}{abs\left(\dfrac{leye(y) + reye(y)}{2} - chin(y)\right)}$ In FIG. 15f, RATIO 6 is $\dfrac{abs\left(\dfrac{leye(y) - reye(y)}{2} - chin(y)\right)}{abs(tophead(y) - chin(y))}$ The measurements used in the ratio are presented in Tables 5 and 6. In these tables, "ochin" refers to oval-chin, which is calculated as the base of the initial oval. The term "ochin" refers to the chin position (x,y) gotten from the oval, where the x value is the same as the value of the oval_center (x) and the y value is computed by oval_center(y)–fb. For Tables 5 and 6, the vertical columns are calculated as follows:

$$eye\_avg\_y = \dfrac{leye(y) + reye(y)}{2}$$

oval_chin_y=oval_center(y)–fb leye-reye=abs(leye(x)–reye(x))

eye-nose=abs(eye_avg_y-nose(y))

eye-mouth=abs(eye_avg_y-mouth(y))

eye-chin=abs(eye_avg_y-chin(y))

eye-ochin=abs(eye_avg_y-oval_chin_y)

In the case of baby01, the vertical columns from table 5 is as follows:

eye_avg_y=(106+110)/2=108 oval_chin_y=105–85=20 leye-reye=abs(113–165)=52 eye-nose=abs(108–73)=35 eye-mouth=abs(108–52)=56 eye-chin=abs(108–19)=89 eye-ochin=abs(108–20)=88

TABLE 5

Intermediate calculations for the ratio calculations for baby class.

| subject | eye_avg_y | oval_chin_y | leye-reye | eye-nose | eye-mth | eye-chin | eye-ochin |
|---|---|---|---|---|---|---|---|
| baby01 | 108 | 20 | 52 | 35 | 56 | 89 | 88 |
| baby02 | 137 | 41 | 60 | 39 | 61 | 97 | 96 |
| baby03 | 152 | 88 | 34 | 24 | 38 | 59 | 64 |
| baby04 | 137 | 65 | 42 | 28 | 45 | 73 | 72 |
| baby05 | 131 | 54 | 44 | 34 | 47 | 76 | 77 |
| baby08 | 120 | 22 | 54 | 40 | 62 | 99 | 98 |
| baby10 | 115 | — | 56 | 36 | 57 | — | — |
| baby12 | 102 | 11 | 50 | 32 | 53 | — | 91 |
| baby13 | 139 | 65 | 46 | 29 | 48 | — | 74 |
| baby14 | 156 | 84 | 42 | 29 | 46 | 70 | 72 |
| baby15 | 113 | — | 50 | 33 | 53 | — | — |
| baby16 | 134 | — | 44 | 29 | 45 | — | — |
| baby17 | 117 | 27 | 54 | 35 | 59 | — | 90 |
| baby18 | 137 | 40 | 52 | 38 | 62 | 100 | 97 |
| baby19 | 141 | — | 54 | 26 | 53 | — | — |
| baby20 | 120 | 51 | 44 | 27 | 46 | 66 | 69 |
| baby21 | 138 | — | 52 | 30 | 53 | — | — |
| baby22 | 148 | 72 | 40 | 28 | 43 | — | 76 |
| baby24 | 130 | 44 | 52 | 30 | 46 | 86 | 86 |
| baby25 | 121 | — | 54 | 30 | 55 | — | — |
| b02 | 128 | — | 48 | 31 | 55 | — | — |
| b06 | 144 | — | 46 | 33 | 51 | 89 | — |
| b07 | 117 | 31 | 48 | 33 | 53 | — | 86 |
| b09 | 136 | — | 54 | 31 | 51 | — | — |
| b18 | 158 | — | 40 | 23 | 40 | — | — |

TABLE 6

Intermediate calculations for the ratio calculations for adult and senior classes.

| subject | eye_avg_y | oval_chin_y | leye-reye | eye-nose | eye-mth | eye-chin | eye-ochin |
|---|---|---|---|---|---|---|---|
| snr01 | 117 | 14 | 62 | 52 | 68 | — | 103 |
| snr02 | 144 | 54 | 52 | 30 | — | — | 90 |
| snr03 | — | — | — | — | — | — | — |
| snr05 | 149 | — | 50 | 35 | 53 | — | — |
| snr06 | 130 | 62 | 42 | 25 | 43 | — | 68 |
| snr07 | — | 81 | — | — | — | — | — |
| snr10 | — | — | — | — | — | — | — |
| snr11 | 153 | 76 | 42 | — | 42 | — | 77 |
| snr15 | 159 | 65 | 42 | — | 59 | — | 94 |
| snr18 | 139 | 25 | 62 | 54 | 76 | — | 114 |
| s01 | 125 | 26 | 56 | 38 | 60 | 94 | 99 |
| s10 | 129 | 38 | 54 | 40 | 62 | 91 | 91 |
| s11 | 131 | — | 56 | 39 | 59 | — | — |
| s12 | 157 | 60 | 58 | 38 | 62 | 96 | 97 |
| adult01 | 148 | 23 | 68 | 48 | 78 | 128 | 125 |
| adult04 | 128 | 38 | 46 | 36 | 58 | 91 | 90 |
| a01 | 146 | — | 40 | 34 | 48 | 77 | — |
| a02 | 150 | 74 | 44 | 34 | 47 | 77 | 76 |
| a04 | 154 | 81 | 40 | 33 | 43 | 74 | 73 |
| a06 | 152 | 79 | 40 | 36 | 49 | 76 | 73 |
| a12 | 134 | — | 36 | 30 | 42 | — | — |
| a19 | 169 | 94 | 44 | 27 | 45 | 75 | 75 |

Tables 7 and 8 show the calculated ratios. Ratio 6 is not included here but is discussed later. Ratios 3 and 5 use the chin and thus have corresponding ratios 3b and 5b for when the chin is obtained from the initial oval. In these tables, "ochin" refers to oval-chin. For Tables 7 and 8, the Ratios are calculated as described in the FIG. 15 equations.

In the case of baby 01, the vertical columns from Table 7 are calculated as follows:
Ratio 1=52/35=1.4857

Ratio 2=52 /56=0.9286

Ratio 3a=52/89=0.5843

Ratio 3b=52/88=0.5909

Ratio 4=35/56=0.6250

Ratio5a=56/89=0.6292

Ratio 5b=56/88=0.6394

TABLE 7

Results of the ratio computation with real images for baby class.

| subject | Ratio1 nose-T | Ratio2 mth-T | Ratio3a chin-T | Ratio3b ochin-T | Ratio4 e-n-m | Ratio5a e-m-c | Ratio5b e-m-ochin |
|---|---|---|---|---|---|---|---|
| baby01 | 1.4857 | 0.9286 | 0.5843 | 0.5909 | 0.6250 | 0.6292 | 0.6364 |
| baby02 | 1.5385 | 0.9836 | 0.6186 | 0.6250 | 0.6393 | 0.6289 | 0.6354 |
| baby03 | 1.4167 | 0.8947 | 0.5763 | 0.5313 | 0.6316 | 0.6441 | 0.5938 |
| baby04 | 1.5000 | 0.9333 | 0.5753 | 0.5833 | 0.6222 | 0.6164 | 0.6250 |
| baby05 | 1.2941 | 0.9362 | 0.5789 | 0.5714 | 0.7234 | 0.6184 | 0.6104 |
| baby08 | 1.3500 | 0.8710 | 0.5455 | 0.5510 | 0.6452 | 0.6263 | 0.6327 |
| baby10 | 1.5556 | 0.9825 | — | — | 0.6316 | — | — |
| baby12 | 1.5625 | 0.9434 | — | 0.5495 | 0.6038 | — | 0.5824 |
| baby13 | 1.5862 | 0.9583 | — | 0.6216 | 0.6042 | — | 0.6486 |
| baby14 | 1.4483 | 0.9130 | 0.6000 | 0.5833 | 0.6304 | 0.6571 | 0.6389 |
| baby15 | 1.5152 | 0.9434 | — | — | 0.6226 | — | — |
| baby16 | 1.5172 | 0.9778 | — | — | 0.6444 | — | — |
| baby17 | 1.5429 | 0.9153 | — | 0.6000 | 0.5932 | — | 0.6556 |
| baby18 | 1.3684 | 0.8387 | 0.5200 | 0.5361 | 0.6129 | 0.6200 | 0.6392 |
| baby19 | 2.0769 | 1.0189 | — | — | 0.4906 | — | — |
| baby20 | 1.6296 | 0.9565 | 0.6667 | 0.6377 | 0.5870 | 0.6970 | 0.6667 |
| baby21 | 1.7333 | 0.9811 | — | — | 0.5660 | — | — |
| baby22 | 1.4286 | 0.9302 | — | 0.5263 | 0.6512 | — | 0.5658 |
| baby24 | 1.7333 | 1.1304 | 0.6047 | 0.6047 | 0.6522 | 0.5349 | 0.5349 |
| baby25 | 1.8000 | 0.9818 | — | — | 0.5455 | — | — |
| b02 | 1.5484 | 0.8727 | — | — | 0.5636 | — | — |
| b06 | 1.3939 | 0.9020 | 0.5169 | — | 0.6471 | 0.5730 | — |
| b07 | 1.4545 | 0.9057 | — | 0.5581 | 0.6226 | — | 0.6163 |
| b09 | 1.7419 | 1.0588 | — | — | 0.6078 | — | — |
| b18 | 1.7391 | 1.0000 | — | — | 0.5750 | — | — |
| Sum | 38.9609 | 23.7579 | 6.3870 | 8.6702 | 15.3384 | 6.8453 | 9.2819 |
| Num Elements | 25 | 25 | 11 | 15 | 25 | 11 | 15 |
| Average | 1.55844 | 0.95032 | 0.58064 | 0.57801 | 0.61354 | 0.62230 | 0.61879 |
| Std Deviation | 0.16851 | 0.06086 | 0.04138 | 0.03434 | 0.04352 | 0.03988 | 0.03469 |
| Variance | 0.02840 | 0.00370 | 0.00171 | 0.00118 | 0.00189 | 0.00159 | 0.00120 |

TABLE 8

Results of the ratio computation with real images for adult and senior classes.

| subject | Ratio1 nose-T | Ratio2 mth-T | Ratio3a chin-T | Ratio3b ochin-T | Ratio4 e-n-m | Ratio5a e-m-c | Ratio5b e-m-ochin |
|---|---|---|---|---|---|---|---|
| snr01 | 1.1923 | 0.9118 | — | 0.6019 | 0.7647 | — | 0.6602 |
| snr02 | 1.7333 | — | — | 0.5778 | — | — | — |
| snr03 | — | — | — | — | — | — | — |
| snr05 | 1.4286 | 0.9434 | — | — | 0.6604 | — | — |
| snr06 | 1.6800 | 0.9767 | — | 0.6176 | 0.5814 | — | 0.6324 |
| snr07 | — | — | — | — | — | — | — |
| snr10 | — | — | — | — | — | — | — |
| snr11 | — | 1.0000 | — | 0.5455 | — | — | 0.5455 |
| snr15 | — | 0.7119 | — | 0.4468 | — | — | 0.6277 |
| snr18 | 1.1481 | 0.8158 | — | 0.5439 | 0.7105 | — | 0.6667 |
| s01 | 1.4737 | 0.9333 | 0.5957 | 0.5657 | 0.6333 | 0.6383 | 0.6061 |
| s10 | 1.3500 | 0.8710 | 0.5934 | 0.5934 | 0.6452 | 0.6813 | 0.6813 |
| s11 | 1.4359 | 0.9492 | — | — | 0.6610 | — | — |
| s12 | 1.5263 | 0.9355 | 0.6042 | 0.5979 | 0.6129 | 0.6458 | 0.6392 |
| adult01 | 1.4167 | 0.8718 | 0.5313 | 0.5440 | 0.6154 | 0.6094 | 0.6240 |
| adult04 | 1.2778 | 0.7931 | 0.5055 | 0.5111 | 0.6207 | 0.6374 | 0.6444 |
| a01 | 1.1765 | 0.8333 | 0.5195 | — | 0.7083 | 0.6234 | — |
| a02 | 1.2941 | 0.9362 | 0.5714 | 0.5789 | 0.7234 | 0.6104 | 0.6184 |
| a04 | 1.2121 | 0.9302 | 0.5405 | 0.5479 | 0.7674 | 0.5811 | 0.5890 |
| a06 | 1.1111 | 0.8163 | 0.5263 | 0.5479 | 0.7347 | 0.6447 | 0.6712 |
| a12 | 1.2000 | 0.8571 | — | — | 0.7143 | — | — |
| a19 | 1.6296 | 0.9778 | 0.5867 | 0.5867 | 0.6000 | 0.6000 | 0.6000 |
| Sum | 23.2862 | 16.0644 | 5.5745 | 8.4071 | 10.7537 | 6.2718 | 8.8060 |
| Num Elements | 17 | 18 | 10 | 15 | 16 | 10 | 14 |
| Average | 1.36977 | 0.89247 | 0.55745 | 0.56047 | 0.67210 | 0.62718 | 0.62900 |
| Std Deviation | 0.15074 | 0.05675 | 0.03475 | 0.02681 | 0.05445 | 0.02700 | 0.02971 |
| Variance | 0.02272 | 0.00322 | 0.00121 | 0.00072 | 0.00296 | 0.00073 | 0.00088 |

Each ratio can now be evaluated individually for the normalicy check and if desired for use in age classification. In Tables 7 and 8, Ratio 6 was not tabulated. For the other five ratios, the ratios were recomputed after dropping the data which was evaluated as unfavorable due to facial expression or rotation of the head. The subjects that were dropped are: baby08, baby24, baby25, b18, snr05, snr11, s11, a04, and a12.

For the five ratios, the individual column data from Tables 7 and 8 are used to obtain classification thresholds. These thresholds are calculated using to the following algorithm of Ohzu N. (1980), "An Automatic Threshold Selection Method Based on Discriminant and Least Squares Criteria", The Transactions of The Institute of Electronics, Information and Communication Engineers, vol. J63-D no. 4., for automatic threshold detection in bi-modal distribution Assume the histogram levels $1, 2, \ldots, L$. There exists an threshold value $k$ which will optimally segement two groups of histogram. Now, we assume the resulting statistics of these two groups as follows:

|  | Group 1 | Group 2 |
|---|---|---|
| Accumulated histogram values: (total no. of pixel in each group) | $n\_1(k)$ | $n\_2(k)$ |
| Mean of the intensities/group: | $m\_1(k)$ | $m\_2(k)$ |
| Variance of each group: | $V\_1(k)$ | $V\_2(k)$ |
| The mean of the whole image: | $m\_t$ | |

Then the total inner variance: $V\_inner = n\_1 * V\_1 + n\_2 * V\_2$
the total intra variance: $V\_intra =$
$n\_1 * (m\_1 - m\_t)^2 + n\_2 * (m\_2 - m\_t)^2$ Obtain the "max($V\_intra/V\_inner$)", the best $k$ values will be solved.

The use of these thresholds for each ratio is now to be discussed.

RATIO 1; nose-T

Ratio 1 is (distance between two eyes:nose to midway point of eyes). Features found from stages 210 through 270 of FIG. 3 are used for this ratio. Table 9 shows the results of the ratio computation with real images, indicating that it is possible to find ratios that span the range of babies to adults, and also to computationally distinguish between baby and non-baby images.

TABLE 9

Results of the ratio computation with real images, indicating that it is possible to computationally distinguish between baby and non-baby images.

| Ratio 1 | Baby | Adult |
|---|---|---|
| Sum | 32.3384 | 18.0096 |
| Num of Elements | 21 | 13 |
| Average | 1.53993 | 1.38535 |
| Std Deviation | 0.16001 | 0.15751 |
| Variance | 0.02560 | 0.02481 |

The threshold found by the method of the algorithm listed above for Ratio 1 is 1.48. The threshold correctly classifies 14 out of 21 babies (67%) and 9 out of 13 adults (69%). The location of the nose position is tricky because of the nose protrusion. Nevertheless, a good nose position is acquired consistently for the faces in our database. Although a higher classification percentage is desired, this ratio provides a reasonably reliable classification.

RATIO 2: mouth-T

Ratio 2 is (distance between two eyes:mouth to midway point of eyes). Features found from stages 1 through 6 of FIG. 3 are used for this ratio. Table 10 shows th results of the ratio computation with real images, indicating that it is possible to computationally distinguish between baby and non-baby images.

TABLE 10

Results of the ratio computation with real images, indicating that it is possible to computationally distinguish between baby and non-baby images.

| Ratio 2 | Baby | Adult |
|---|---|---|
| Sum | 19.7747 | 11.3845 |
| Num of Elements | 21 | 13 |
| Average | 0.94165 | 0.87573 |
| Std Deviation | 0.00232 | 0.05992 |
| Variance | 0.00232 | 0.00359 |

The threshold found by the method of the algorithm for automatic threshold detection in bi-modal distribution, for Ratio 2 is 0.91. This threshold correctly classifies 16 out of 21 babies (76%) and 7 out of 13 adults (54%). This appears to be the ratio that can be measured reliably and also in providing reliable classification.

RATIO 3: chin-T

Ratio 3 is (distance between two eyes:chin to midway point of eyes). This ratio makes use of features found by stages 1 through 5 of FIG. 3. Table 11 shows the results of the ratio computation with real images, indicating that it is possible to computationally distinguish between baby and non-baby images.

TABLE 11

Results of the ratio computation with real images, indicating that it is possible to computationally distinguish between baby and non-baby images.

| Ratio 3a | Baby | Adult |
|---|---|---|
| Sum | 5.2369 | 5.0340 |
| Num of Elements | 9 | 9 |
| Average | 0.58188 | 0.55933 |
| Std Deviation | 0.04347 | 0.03614 |
| Variance | 0.00189 | 0.00131 |

The threshold found by the method of the algorithm for automatic threshold detection in bi-modal distribution, for Ratio 3a is 0.57. This threshold correctly classifies 7 out of 9 babies (78%) and 4 out of 9 adults (44%). Localizing the chin is difficult to perform with consistency, due to changes in shading and shadowing, multiple chins, the possibility of an open jaw, and the possibility of facial hair. The classification result based on this ratio should not be ruled out as a possible candidate. Several factors could have contributed to this result. The shape of the chin varies greatly from a person to person which allows diverse results in the measurements of this ratio.

Table 12. shows the results of the ratio computation with real images, indicating that it is possible to computationally distinguish between baby and non-baby images.

TABLE 12

Results of the ratio computation with real images, indicating that it is possible to computationally distinguish between baby and non-baby images.

| Ratio 3b | Baby | Adult |
|---|---|---|
| Sum | 7.5145 | 7.3137 |
| Num of Elements | 13 | 13 |
| Average | 0.57804 | 0.56259 |
| Std Deviation | 0.03535 | 0.02781 |
| Variance | 0.00125 | 0.00077 |

The threshold found by the method of the algorithm for automatic threshold detection in bi-modal distribution, for Ratio 3b is 0.53. This threshold correctly classifies 12 out of 13 babies (92%) and 2 out of 13 adults (15%). Although the chin is more difficult to find, the oval that fits the face is found more easily. The drawback to the oval is that the chin position found from the oval may not be an exact fit because the oval finds the best fit including the sides of the face. The data supports the fact that ratio 3b is not bimodal; even the averages are very similar.

RATIO 4: eye-nose: eye-mouth

Ratio 4 is (Nose to midway point of eyes: mouth to midway point of eyes). This ratio uses features from stages 1 through 7 of Fig. Table 13 shows the results of the ratio computation with real images, indicating that it is possible to computationally distinguish between baby and non-baby images.

TABLE 13

Results of the ratio computation with real images, indicating that it is possible to computationally distinguish between baby and non-baby images.

| Ratio 4 | Baby | Adult |
|---|---|---|
| Sum | 12.9206 | 7.9505 |
| Num of Elements | 21 | 12 |
| Average | 0.61527 | 0.66254 |
| Std Deviation | 0.04292 | 0.04942 |
| Variance | 0.00184 | 0.00244 |

The threshold found by the the method of the algorithm for automatic threshold detection in bi-modal distribution, for Ratio 4 is 0.62. This threshold correctly classifies 8 out of 21 babies (38%) and 8 out of 12 adults (67%).

RATIO 5: eye-mouth: eye-chin

Ratio 5 is (mouth to midway point of eyes:chin to midway point of eyes). This ratio uses features from stages 1 through 6 of FIG. 3. Table 14 shows the results of the ratio computation with real images, indicating that it is possible to computationally distinguish between baby and non-baby images.

TABLE 14

Results of the ratio computation with real images, indicating that it is possible to computationally distinguish between baby and non-baby images.

| Ratio 5a | Baby | Adult |
|---|---|---|
| Sum | 5.6842 | 5.6907 |
| Num of Elements | 9 | 9 |
| Average | 0.63157 | 0.63230 |
| Std Deviation | 0.03173 | 0.02341 |
| Variance | 0.00101 | 0.00055 |

The threshold found by the method of the algorithm for automatic threshold detection in bi-modal distribution, for Ratio 5a is 0.64. This threshold correctly classifies 6 out of 9 babies (67%) and 3 out of 9 adults (33%). This ratio also has the chin location problem. This ratio can best be used when the chin is located in a more accurate manner. The data supports the fact that ratio 3b is not bimodal; even the averages are very similar.

Table 15 shows the results of the ratio computation with real images, indicating that it is possible to computationally distinguish between baby and non-baby images.

TABLE 15

Results of the ratio computation with real images, indicating that it is possible to computationally distinguish between baby and non-baby images.

| Ratio 5b | Baby | Adult |
|---|---|---|
| Sum | 8.1143 | 7.6715 |
| Num of Elements | 13 | 12 |
| Average | 0.62418 | 0.63929 |
| Std Deviation | 0.02833 | 0.02743 |
| Variance | 0.00080 | 0.00075 |

The threshold found by the method of the algorithm for automatic threshold detection in bi-modal distribution, for Ratio 5b is 0.63. This threshold correctly classifies 6 out of 13 babies (46%) and 7 out of 12 adults (58%). The oval chin is more consistently acquired but also suffers from the overall initial oval fitting. The data supports the fact that ratio 3b is not bimodal; even the averages are very similar. The classification from this ratio with a better oval fit will improve its performance.

RATIO 6: eye-chin: top_head-chin

Ratio 6 is the height of the eyes within the top and bottom head-margins. For this ratio, it is not practical to obtain the true top of the head, hence, the virtual top of the head is used. This ratio makes use of features found in stages 1 through 5 of FIG. 3. This is the most reliable of the ratios, if the top of the head could be found. It has low intraclass variance, and high interclass variance. However, our method of measurement of the virtual top of the head is not consistently correct when the hair lies around the ears, whether or not the person is bald, and to variation in the actual shape of the lower part of the head. This measurement could be improved with better methods to estimate hair configurations.

Between all the ratios, ratio 1 is the most promising ratio. This ratio uses features which are not affected by any facial expressions or facial motions. However, it too is subject to imprecise localization. If made robust to shading, shadowing, and occlusion effects, this ratio can be improved to serve as a good classifier.

Ratios 1, 2, and 3 can suffer if the face is rotated in depth, and as such some measure may need to be adopted to compensate for this rotation, before the ratios are computed. Ratios 4, 5, and 6 are more consistently correct when this occurs. Enhancement can occur by combining several ratios to make the final ratio classification. Such combination could be based on statistical analysis.

Referring to FIG. 3, stage seven, 270, is to verify that facial features are normal as expected to what a face should have. For detection and recognition, reference ratios of digital images can be initially stored in a digital computer and subsequently compared to a newly detected digital image including a margin for error. The stored reference ratios can include but are not limited to specific age groups, gender groups, specific individuals and the like.

For example, the various ratio categories for three general age classes was determined in the inventors patent application 08/198,816, which has been incorporated by reference. For instance, in actual application, a digital camera can be preprogamed with a reference ratio for babies up to the age of three years old. In operation the described invention will compare a newly received digital image to compute a ratio and compare this new ratio to the reference ratio in order to locate and identify a baby from individuals of different age groups in the image.

The invention described herein is intended to allow for a computer to automaticly detect a single facial image from a digital image that includes extraneous facial and/or nonfacial images, to at least the same degree as having a human to find a face in the digital image. Similarly, the invention further allows for recognition of different facial expressions by a computer to at least the same degree as having a human interprett another person's facial expression.

Other facial features can also be examined. Skin and eye color restrictions can also be loosened. Then, the confirmation of facial features in the presence of eye patches and dark glasses, and other occlusions and shadowing effects can be compensated for. Confirmation of facial features can also be made robust to varieties of moustaches and facial scars, and dishevelled hair. Finally, an accurate estimation of the top of the skull may be able to be computed to aid in enhancing the accuracy facial feature confirmation.

Further, additional age related information can also be used to enhance facial feature confirmation. Additional information incorporated for age-based facial-finding, includes but is not limited to the growth of the nose and the nose-bridge, the relative shrinking of the iris-size over time, and changes to the outline of the face.

While the preferred embodiment describes detection of human faces, the invention is not limited to detection and recognition of only human faces. For example, the invention would be applicable to be used to detect and center in on other pre-programmed objects, such as but not limited to animals, plants, and artificial objects such as but not limited to automobiles and buildings. Thus, other reference ratios can be calculated and used for subsequent comparison.

The invention is not limited to detecting only from a digitized image. For example, an analog based image can be converted by well known analog to digital converters into a digitized image. Furthermore, the image can itself be based on any known method that quantifies the amount of light coming in at points in space, such as but not limited to pixel points.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of detecting a single human face from a two dimensional digital image comprising the steps executed by a computer of:

(a) locating a single human face in a two-dimensional digital image by:
  (i) blurring the digital image with a blurring filter;
  (ii) enhancing edges of the digital image with an edge enhancer;
  (iii) dropping first snakelet-curves onto the digital image , the first snakelet-curves using a Hough Transform voting process to find exterior oval-curves representing a single candidate face-location;
  (iv) dropping second snakelet-curves inside the exterior oval-curves on the single candidate face-location, the second snakelet-curves using a Hough Transform voting process to determine positions of the chin and positions of sides of a single face; and (b) confirming existence of additional facial features inside the exterior oval curves by:
  (i) positioning a template outline on the chin positions and sides of the face positions to determine left and right eyes, mouth and nose of a face, the template outline having a single preselected configuration of a template left eye within a first preselected region, a template right eye within a second preselected region, a template mouth within a third preselected region and a template nose within a fourth preselected region;
  (ii) determining positions of the left eye, the right eye, the nose, and the mouth with the template outline;
  (iii) determining facial feature ratios between the left eye position, the right eye position, the nose position, the mouth position, the sides of face positions, and the chin position; and
  (iv) verifying the facial feature ratios to be within selected value ranges.

2. The method of detecting the human face of claim 1, wherein the digital image is formed from:

a digital camera.

3. The method of detecting the human face of claim 1, wherein the digital image is formed from:

an analog signal converted to a digital image.

* * * * *